United States Patent
Nakajima

(10) Patent No.: US 8,700,702 B2
(45) Date of Patent: *Apr. 15, 2014

(54) DATA EXTRACTION SYSTEM, TERMINAL APPARATUS, PROGRAM OF THE TERMINAL APPARATUS, SERVER APPARATUS, AND PROGRAM OF THE SERVER APPARATUS FOR EXTRACTING PRESCRIBED DATA FROM WEB PAGES

(75) Inventor: Kengo Nakajima, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,616

(22) Filed: Aug. 24, 2012

(65) Prior Publication Data

US 2012/0323882 A1 Dec. 20, 2012

Related U.S. Application Data

(63) Continuation of application No. 11/991,451, filed as application No. PCT/JP2005/019775 on Oct. 27, 2005, now Pat. No. 8,321,198.

(30) Foreign Application Priority Data

Sep. 6, 2005 (JP) ................................. 2005-257325

(51) Int. Cl.
   *G06F 15/16* (2006.01)
   *G06F 17/28* (2006.01)
(52) U.S. Cl.
   USPC .................. 709/203; 704/4; 704/9; 704/257; 709/206; 709/217

(58) Field of Classification Search
   USPC ...................... 704/4, 9, 257, 270, 270.1, 275; 709/203, 206, 217
   See application file for complete search history.

(56) References Cited

U.S. PATENT DOCUMENTS

| 5,933,822 A | 8/1999 | Braden-Harder et al. |
| 5,983,170 A | 11/1999 | Goodman |

(Continued)

FOREIGN PATENT DOCUMENTS

| JP | 11-134334 | 5/1999 |
| JP | 11-282873 | 10/1999 |

(Continued)

OTHER PUBLICATIONS

Kritikopoulos et al. "Crawlwave: a distributed crawler" 2004.*

(Continued)

*Primary Examiner* — Vijay B Chawan
(74) *Attorney, Agent, or Firm* — Greenblum & Bernstein, P.L.C.

(57) ABSTRACT

This invention provides a terminal searching for web pages on the web and extracting the prescribed data from the web pages and a server verifying and accumulating the extracted data. The prescribed data can be extracted from the web pages on the web in a manner that the process relating to the data extraction is distributed between the terminal and the server. Therefore, necessary processes up to the data extraction are distributed, and the burden placed on each apparatus can be lessened. Further, new data not formerly found in the web pages can be found out and extracted from the web pages that has been updated or newly made.

20 Claims, 14 Drawing Sheets

(56) References Cited

U.S. PATENT DOCUMENTS

| | | | |
|---|---|---|---|
| 6,101,492 | A | 8/2000 | Jacquemin et al. |
| 6,182,063 | B1 | 1/2001 | Woods |
| 6,192,333 | B1 | 2/2001 | Pentheroudakis |
| 6,212,494 | B1 | 4/2001 | Boguraev |
| 6,418,453 | B1 | 7/2002 | Kraft et al. |
| 6,480,837 | B1 | 11/2002 | Dutta |
| 6,631,369 | B1 | 10/2003 | Meyerzon et al. |
| 6,714,905 | B1 | 3/2004 | Chang et al. |
| 6,850,937 | B1 | 2/2005 | Hisamitsu et al. |
| 6,901,399 | B1 | 5/2005 | Corston et al. |
| 7,065,483 | B2 | 6/2006 | Decary et al. |
| 7,072,890 | B2 | 7/2006 | Salerno et al. |
| 7,130,861 | B2 | 10/2006 | Bookman et al. |
| 7,139,747 | B1 | 11/2006 | Najork |
| 7,194,454 | B2 | 3/2007 | Hansen et al. |
| 7,213,013 | B1 | 5/2007 | Subramaniam et al. |
| 7,302,646 | B2 | 11/2007 | Nomiyama et al. |
| 7,424,421 | B2 | 9/2008 | Okumura |
| 7,444,358 | B2 | 10/2008 | Paczkowski et al. |
| 7,502,779 | B2 | 3/2009 | Brockway et al. |
| 7,509,313 | B2 | 3/2009 | Colledge et al. |
| 7,653,870 | B1 | 1/2010 | Knauft et al. |
| 7,660,815 | B1 | 2/2010 | Scofield et al. |
| 7,689,557 | B2 | 3/2010 | Pandit et al. |
| 7,707,147 | B2 | 4/2010 | Steels et al. |
| 7,756,807 | B1 | 7/2010 | Komissarchik et al. |
| 7,783,476 | B2 | 8/2010 | Yang |
| 7,844,594 | B1 * | 11/2010 | Holt et al. ............ 707/709 |
| 2002/0052928 | A1 | 5/2002 | Stern et al. |
| 2002/0111792 | A1 | 8/2002 | Cherny |
| 2002/0194230 | A1 | 12/2002 | Polanyi et al. |
| 2003/0154071 | A1 | 8/2003 | Shreve |
| 2005/0071766 | A1 | 3/2005 | Brill et al. |
| 2005/0125412 | A1 | 6/2005 | Glover |
| 2005/0197829 | A1 | 9/2005 | Okumura |
| 2005/0251384 | A1 | 11/2005 | Yang |
| 2006/0018551 | A1 * | 1/2006 | Patterson ............ 382/229 |
| 2006/0031195 | A1 | 2/2006 | Patterson |
| 2006/0041562 | A1 * | 2/2006 | Paczkowski et al. ........ 707/10 |
| 2006/0064411 | A1 | 3/2006 | Gross et al. |

FOREIGN PATENT DOCUMENTS

| | | |
|---|---|---|
| JP | 2000-112978 | 4/2000 |
| JP | 2003-178261 | 6/2003 |
| JP | 2003-248494 | 9/2003 |
| JP | 2005-149359 | 6/2005 |

OTHER PUBLICATIONS

Najork et al.,"High-Performance Web Crawling" 2001.
Shkapenyuk et al., "Design and Implementation of a High-Performance Distributed Web Crawler" 2002.
Edwards et al., An Adaptive Model for Optimizing Performance of an Incremental Web Crawler 2001.
Brin et al., "The anatomy of a large-scale hypertextual Web search engine" 1998.
Singh et al., "Apoidea: A Decentralized Peer-to-Peer Architecture for Crawling the World Wide Web" 2003.
Cho et al., "Parallel Crawlers" 2002.
Thelwall, "A web crawler design for data mining" 2001.
Embley et al., "Conceptual-model-based data extraction from multiple-record Web pages" 1999.
Soderland, "Learning Information Extraction Rules for Semi-Structured and Free Text" 1999.
Phillips et al., "Exploiting Strong Syntactic Heuristics and Co-Training to Learn Semantic Lexicons" 2002.
Etzioni et al., "Unsupervised named-entity extraction from the Web: An experimental study" Apr. 2005.

* cited by examiner

DATA EXTRACTION SYSTEM, TERMINAL APPARATUS, PROGRAM OF THE TERMINAL APPARATUS, SERVER APPARATUS, AND PROGRAM OF THE SERVER APPARATUS FOR EXTRACTING PRESCRIBED DATA FROM WEB PAGES

CROSS REFERENCE TO RELATED APPLICATIONS

The present application is a continuation application of U.S. patent application Ser. No. 11/991,451, filed on Mar. 5, 2008, which is a U.S. National Stage of International Application No. PCT/JP2005/019775, filed on Oct. 27, 2005, which claims the benefit of Japanese Application No. 2005-257325, filed Sep. 6, 2005. The disclosure of each of these documents, including the specification, drawings, and claims, is incorporated herein by reference in its entirety.

FIELD OF THE INVENTION

The present invention relates to a data extraction system for extracting prescribed data from web pages on the web. In addition, the present invention relates to a server apparatus and a terminal apparatus used in the data extraction system and also relates to a program for the server apparatus and a program for the terminal apparatus.

BACKGROUND ART

Conventionally, an information extraction apparatus is developed to extract numerical data associated with parts-of-speech such as noun upon performing morphological analysis on text data (see, Patent Document 1 for example). The conventional apparatus cuts out the text data one sentence at a time and extracts sentences having numerical values. A judgment is then made for sentence modification and phrases associated with numerical values are extracted.
Patent Document 1: Japanese Patent Application Publication No. 2005-149359

DISCLOSURE OF THE INVENTION

The information extraction apparatus described in Patent Document 1, however, has a problem of placing a burden on a single apparatus because the single apparatus executes all of the processes such as the morphological analysis of the acquired text data, extraction of the phrases, accumulation of the phrases, and display of the phrases.

In addition, along with recent development of network technology, many websites have been established, but a system for performing morphological analysis of the web pages on these websites did not exist. To analyze web pages using a single apparatus like the apparatus described in Patent Document 1, a huge data capacity is required, and thus, is not realistic. Further, in a case where sounds or images on the web are analyzed, it is also impossible for a single apparatus to execute the analysis.

The present invention takes into account the aforementioned conditions and aims to provide a data extraction system that can lessen the burden placed on each apparatus by distributing the processes necessary for extracting phrases and the like. There is a further aim to provide the server apparatus and the terminal apparatus used in the data extraction system, as well as the program for the terminal apparatus and the program for the server apparatus.

The data extraction system of the present invention is a data extraction system for extracting prescribed data from web pages on the web and contains multiple terminals and a server connected to the terminals. The server contains a data accumulation section for accumulating the prescribed data extracted by any one of the terminal and a verification section for verifying whether the extracted prescribed data is already accumulated by the data accumulation section. The terminal contains a search section for searching for the web page on the web, an extraction section for extracting the prescribed data from the web page, and an output section for receiving from the server the prescribed data or information corresponding to the prescribed data determined by the verification section to not be already accumulated by the data accumulation section, and for outputting the prescribed data or the information corresponding to the prescribed data.

In the data extraction system of the present invention, the terminal searches for the web page on the web and extracts the prescribed data from the web page. The extracted data is verified by the server and accumulated. That is, the prescribed data can be extracted from the web page on the web in a manner that the processes relating to the data extraction are distributed between the terminal and the server, so that new data formerly found in web pages can be extracted from a web page on the web that has been updated or newly made.

In the data extraction system of the present invention, the prescribed data is a phrase comprising a prescribed combination of parts of speech of morphemes. The server contains a part-of-speech accumulation section for accumulating the prescribed combination of parts of speech of the morphemes for extracting the phrase. The terminal contains a morphological analysis section for performing morphological analysis on text data in the web page searched for by the search section, receives the combination of parts of speech of the morphemes accumulated by the part-of-speech accumulation section from the server in advance, extracts from the text data, on which the morphological analysis section performed morphological analysis, the phrase made up of the combination of parts of speech of the morphemes identical to the combination of parts of speech of the morphemes received from the server, receives from the server the phrase determined by the verification section to not be already accumulated by the data accumulation section, and displays the phrase in a display screen through an output section. Therefore, morphological analysis is performed by the terminal on the text data in the web page, the phrase made up of the combination of parts of speech of the morphemes accumulated by the part-of-speech accumulation section of the server can be extracted, and the verification section of the server can make a judgment as to whether the phrase is already accumulated by the data accumulation section. Accordingly, the process relating to the phrase extraction can be distributed between the server and the terminal, and therefore, morphological analysis can be performed on web pages which contain a large amount of data on the web.

In the data extraction system of the present invention, the server sends to all of the multiple terminals the phrase determined by the verification section to not be already accumulated by the data accumulation section, so that the new phrase extracted by any one of the terminals can be shared with all of the terminals. In addition, it becomes unnecessary for one terminal to analyze all of the text data on the web, thereby further lessening the burden placed on the terminal because the process of extracting the phrase can be distributed among each terminal.

In the data extraction system of the present invention, the server sends to the terminal, which extracted the phrase through the extraction section, the phrase determined by the verification section to not be already accumulated by the data accumulation section, and the terminal that receives the phrase sends the phrase to another terminal, so that the extracted new phrase can be shared between all of the terminals. By making the displayed phrase transmittable between the multiple terminals, the server does not need to transmit the phrase to all of the terminals. In addition, the terminal that receives the phrase does not send the phrase to all of the terminals connected to the server. That is, the sending of the phrase can be distributed between the terminals connected to the server, thereby lessening the burden placed on the terminals and the server.

In the data extraction system of the present invention, the part-of-speech accumulation section accumulates a new combination of parts of speech input by the terminal, so that phrases having the combination of parts of speech of interest to the user can be extracted.

In the data extraction system of the present invention, the server sends to the terminal only the phrase fulfilling a prescribed condition from among the phrases extracted by the extraction section, so that only the phrase fulfilling the prescribed condition is displayed, and the phrases that become noise are less likely to be displayed. Accordingly, more appropriate phrase extraction is possible.

In the data extraction system of the present invention, the terminal receives only the web page fulfilling a prescribed condition, so that phrases that can become noise are less likely to be displayed by the terminal. Accordingly, appropriate phrase extraction is possible.

In the data extraction system of the present invention, the server sends to the terminal the combination of parts of speech requested by the terminal, so that the user can extract only the phrases made from combination of parts of speech in which the user is interested, thereby making the system easy for the user to use.

In the data extraction system of the present invention, the output section of the terminal receives from the web the web page from which the phrase was extracted when a phrase displayed in the display screen is selected by the user, and displays the web page on the display screen of the terminal, so that the user can see how the phrase extracted by the present system is used. That is, the user can easily make use of the displayed phrase as a new phrase.

In the data extraction system of the present invention, the server calculates the number of times a phrase is selected which is displayed in the display screens of multiple terminals, and sends the display information based on the number of times to the terminals so that the terminals display the display information in a manner that the number of times is associated with the phrase, and thus the user can know what phrase is focused on by the entire users of the data extraction system.

In the data extraction system of the present invention, the terminal contains an image extraction section for extracting an image from the web page searched for by the search section. The server receives the extracted image, contains an image accumulation section for accumulating the image, and verifies, by the verification section, whether the extracted image is already accumulated in the image accumulation section. The terminal receives from the server the information corresponding to the image determined by the verification section to not be already accumulated by the image accumulation section, and displays the information corresponding to the image in the display screen through the output section. Thus, the image can be extracted from the web page on the web, along with the phrase in the text data, in the same manner. That is, new images not formerly found in web pages can be found and extracted from a web page on the web that has been updated or newly made.

In the data extraction system of the present invention, the terminal contains an image compression section for compressing the image to the prescribed number of bytes by decreasing the size and the number of colors of the image. The server receives the image compressed by the image compression section, accumulates the compressed image through the image accumulation section, and verifies by the verification section whether the image is already accumulated by the image accumulation section based on bit strings of the compressed image. Thus, the size of the image and the image data can be decreased. Accordingly, the verification section of the server can quickly verify a large quantity of images accumulated by the image accumulation section and images compressed and extracted by the terminal. Accordingly, a large amount of data extracted from web pages can be quickly processed.

In the data extraction system of the present invention, the terminal contains a sound extraction section for extracting a sound from the web page searched for by the search section. The server receives the extracted sound, contains a sound accumulation section for accumulating the sound, and verifies, by the verification section, whether the extracted sound is already accumulated in the sound accumulation section. The terminal then receives from the server the information corresponding to the sound determined by the verification section to not be already accumulated by the sound accumulation section and outputs the information corresponding to the sound through the output section. Thus, the sound can be extracted from the web page on the web, along with the phrase in the text data, in the same manner. That is, new sounds not formerly found in web pages can be found and extracted from a web page on the web that has been updated or newly made.

In the data extraction system of the present invention, the terminal contains a sound compression section for compressing a time-scale of the sound extracted by the sound extraction section. The server receives the sound compressed by the sound compression section, accumulates the compressed sound through the sound accumulation section, and verifies by the verification section whether the sound is already accumulated by the sound accumulation section based on bit strings of the compressed sound. Thus, the size of the sound data can be decreased. Accordingly, the verification section of the server can quickly verify a large quantity of sounds accumulated by the sound accumulation section and sounds compressed and extracted by the terminal. Accordingly, a large amount of data extracted from web pages can be quickly processed.

In the data extraction system of the present invention, the prescribed data may be an image. In addition, the prescribed data may be a sound. Therefore, image and sound can be extracted in the same manner as the phrase.

A terminal apparatus of the present invention is connected to a server and used by a data extraction system extracting prescribed data from web pages on the web. The terminal apparatus contains a search section for searching for the web page from the web, an extraction section for extracting the prescribed data from the web page, a data sending section for sending to the server the prescribed data extracted by the extraction section, a data reception section for receiving from the server the prescribed data determined to not be already accumulated by the data accumulation section or information corresponding to the prescribed data upon a verification whether the prescribed data sent by the data sending section is already accumulated by the data accumulation section of the server, and an output section for outputting the prescribed data or the information corresponding to the prescribed data received by the data reception section.

Through the terminal apparatus of the present invention, search for web pages and data extraction are executed. That is, the process relating to the phrase extraction can be distributed between the terminal apparatus and the server, and the burden of the process is lessened. Accordingly, the terminal apparatus enables a large amount of data to be analyzed and can quickly execute the process.

A program for a terminal apparatus is for a terminal apparatus connected to a server and used by a data extraction system extracting prescribed data from a web page on the web. The program contains a search process for searching for a web page from the web, an extraction process for extracting the prescribed data from the web page, a data sending process for sending to the server the prescribed data extracted by the extraction process, a data reception process for receiving from the server the prescribed data determined to not be already accumulated by a data accumulation process or information corresponding to the prescribed data upon a verification whether the prescribed data sent by the data sending process is already accumulated by the data accumulation process of the server, and an output process for outputting the prescribed data or the information corresponding to the prescribed data received by the data reception process.

Through the program of the terminal apparatus of the present invention, the terminal apparatus performs the search for web pages and the data extraction, and each process related to the data extraction to be performed by the server connected to multiple terminal apparatuses can be distributed among the multiple terminal apparatuses. That is, the burden of the process placed on each of the terminal apparatuses implementing the program can be lessened. Accordingly, the program enables a large amount of data to be analyzed and can quickly execute the process.

A server apparatus of the present invention is used by a data extraction system extracting prescribed data from a web page on the web and is connected to multiple terminals searching for web pages from the web and extracting the prescribed data from web pages. The server apparatus contains a data reception section for receiving from any one of the terminals the prescribed data extracted by the terminal, a data accumulation section for accumulating the prescribed data received by the data reception section, a verification section for verifying whether the prescribed data received by the data reception section is already accumulated by the data accumulation section, and a data sending section for sending the prescribed data determined by the verification section to not be already accumulated by the data accumulation section or information corresponding to the prescribed data so as that the terminal outputs the prescribed data or the information.

Through the server apparatus of the present invention, the extracted data is verified and the data is accumulated. That is, each process relating to the phrase extraction can be distributed between the connected terminals, and the burden relating to the process can be decreased. Accordingly, the server apparatus enables a large amount of data to be analyzed and can quickly execute the process.

A program for the server is used by a data extraction system extracting prescribed data from a web page on the web. The server apparatus is connected to multiple terminals searching for the web page from the web and extracting the prescribed data from the web page. The program contains a data reception process for receiving from any one of the terminals the prescribed data extracted by the terminal, a data accumulation process for accumulating the prescribed data received by the data reception process, a verification process for verifying whether the prescribed data received by the data reception process is already accumulated by the data accumulation process, and a data sending process for sending the prescribed data determined by the verification process to not be already accumulated by the data accumulation process or information corresponding to the prescribed data so that the terminal outputs the prescribed data or the information.

Through the program for the server apparatus of the present invention, the server apparatus performs such processes as the verification of the data extracted by the terminal and the data accumulation, and each process relating to the data extraction to be performed by the terminals can be distributed between the terminals connected to the server. That is, the burden relating to the processes of the server implementing the program can be decreased. Accordingly, the program enables a large amount of data to be analyzed and can quickly execute the process.

The data extraction system of the present invention searches for web pages on the web and extracts the prescribed data from the web page. The extracted data is then verified by the server and accumulated. That is, the data can be extracted from the web page in a manner that the process relating to extraction of the data can be distributed between the server and the terminals. Thus, new data not formerly found in web pages can be found and extracted from a web page on the web that has been updated or newly made.

The terminal apparatus of the present invention searches for web pages and extracts the data. That is, each process relating to the phrase extraction can be distributed between the server and the terminal apparatuses, and the burden of the process is lessened. Accordingly, the terminal apparatus enables a large amount of data to be analyzed and can quickly execute the process.

The program for the terminal apparatus of the present invention has the terminal apparatuses perform processes for searching for web pages and data extraction, and thus, enables distribution of each process related to the data extraction to be performed by the server connected to the terminal apparatuses. That is, the burden of the process placed on the terminal apparatus implementing the program can be lessened. Accordingly, the program enables a large amount of data to be analyzed and can quickly execute the process.

The server apparatus of the present invention verifies and accumulates the extracted data. That is, each process relating to the phrase extraction can be distributed between the server apparatus and the connected terminals, and thus, the burden relating to the process can be decreased. Accordingly, the server apparatus enables a large amount of data to be analyzed and can quickly execute the process.

The program for the server apparatus of the present invention has the server apparatus performs processes for the verification and accumulation of the data extracted by the terminals, and thus, can distribute each process relating to data extraction between the server apparatus and the terminals connected to the server apparatus. That is, the burden relating to the processes of the server implementing the program can be decreased. Accordingly, the program enables a large amount of data to be analyzed and can quickly execute the process.

BEST MODE FOR IMPLEMENTING THE INVENTION

The following is a description of the present invention referencing diagrams. Further, the present invention is not limited to the following description and can arbitrarily be altered without deviating from the scope of the invention.

First Embodiment

Figure 1:
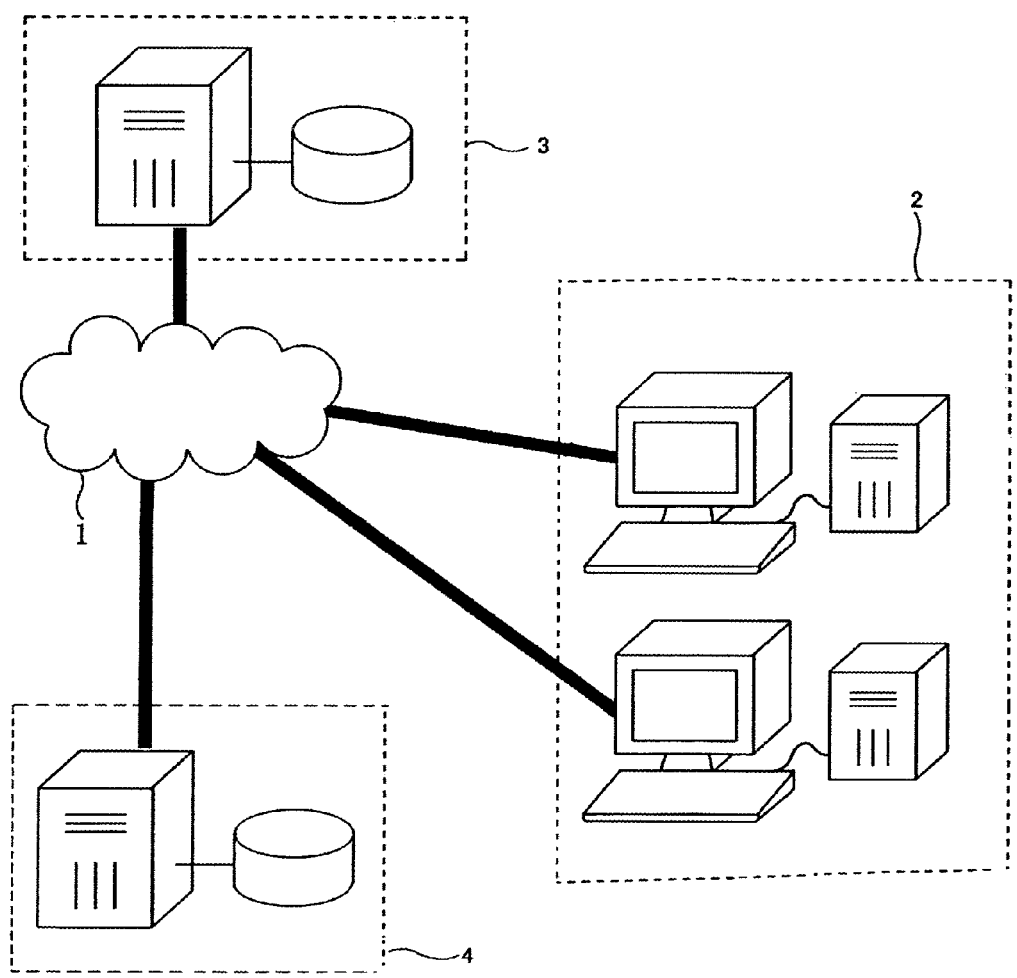
FIG. 1 is a diagram showing the network configuration of the data extraction system described in the first embodiment.

An example structure of the data extraction system of the present invention will be described using FIG. 1 through FIG. 4. As shown in FIG. 1, the data extraction system of the present invention described in the first embodiment contains multiple terminal apparatuses such as personal computers as terminals 2, a server apparatus connected to the multiple terminals 2 via a network 1 as a server 3, and a web server 4 connected via the network 1 to the terminals 2 and the server 3. The terminals 2, server 3, and web server 4 each include a non-transitory computer-readable medium and are capable of communicating with each other.

Figure 2:
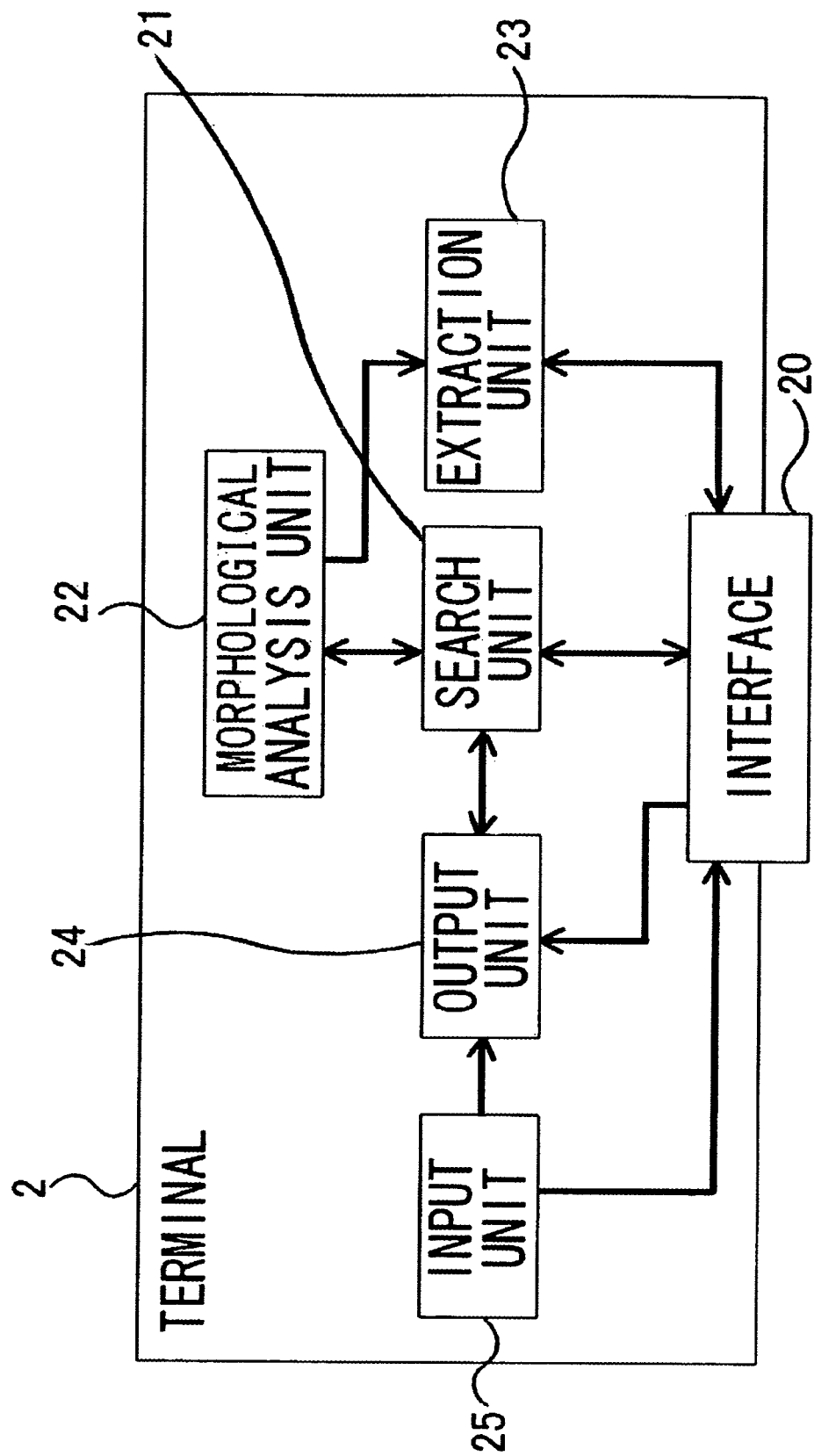
FIG. 2 is a block diagram showing the structure of the terminal of the data extraction system described in the first embodiment.

FIG. 2 is a block diagram showing the structure of the data extraction system of the present invention. Any one of the terminals 2 contains an interface 20, a search unit 21, a morphological analysis unit 22, an extraction unit 23, an output unit 24, and an input unit 25.

The interface unit 20 connects the terminal 2 to the network 1. The terminal 2 sends and receives information concerning phrases, parts of speech, text data, images, sounds, and the like to the server 3 or web server 4 via the interface 20 connected to the network 1.

The search unit 21 is a search section for searching for web pages of the web server 4 connected to the network 1. The search unit 21 receives web pages from the web server 4 via the interface 20. The search unit 21 sends the text data of the received web page to the morphological analysis unit 22. Further, as described later, by having the input unit 25 select the phrase displayed in a display screen by the output unit 24, the web page that includes the text data from which the selected phrase is extracted is received from the web server 4 and displayed in the display screen. The search unit 21 automatically searches for the web page from the web server 4 connected to the terminal 2.

The morphological analysis unit 22 is a morphological analysis section that breaks up the text data into morphemes and executes morphological analysis to analyze the part of speech of the morpheme. The morphological analysis unit 22 executes morphological analysis of the text data of the web page received from the search unit 21, based on a contained dictionary. The dictionary used by the morphological analysis unit 22 has only to be a dictionary for morphological analysis, be it a dictionary received from the web, or a dictionary directly introduced to the terminal 2 from a disk medium.

The extraction unit 23 is an extraction section for extracting a phrase whose morphemes are a prescribed combination of parts of speech, using parts of speech of the morphemes analyzed by the morphological analysis unit 22. The extraction unit 23 receives the prescribed combination of parts of speech of morphemes from the part-of-speech accumulation unit 31 and extracts from the text data on which the morphological analysis unit 22 performed morphological analysis, the phrase whose morphemes are a prescribed combination of parts of speech identical to the received prescribed combination of parts of speech of morphemes. The extraction unit 23 sends the extracted phrase to the server 3 via the interface 20 functioning as a data sending section. In addition, at the time of extraction, the extraction unit 23 is capable of not extracting a phrase that includes unknown morphemes that are not in the dictionary.

The phrase is data made up of a single morpheme or multiple morphemes. For example, a Japanese phrase meaning "pattern recognition neuron" is formed of three morphemes respectively meaning "pattern", "recognition", and "neuron", and a Japanese phrase meaning "screen" is formed of a single morpheme meaning "screen".

The morphemes are classified as parts of speech such as nouns, adjectives, particles, and verbs. For example, in the aforementioned example, "pattern", "recognition", "neuron", and "screen" are all nouns. In the manner described above, the morphological analysis unit 22 breaks up the text data into morphemes based on the loaded dictionary and analyzes the parts of speech of the morphemes. In addition, morphemes that are not in the dictionary are labeled as unknown morphemes.

After the analysis of the parts of speech of the morphemes, the extraction unit 23 makes a judgment as to whether the parts of speech of the morphemes forming one of the phrases is of the prescribed combination and then extracts this prescribed combination as phrase data. For example, in a case where "noun" "noun"+"noun" is received from the server so as to extract a phrase having three nouns in a row as the combination of the parts of speech of the morpheme, if "pattern recognition neuron" is included in the text data on which morphological analysis is performed, as in the example above, the "pattern recognition neuron" is extracted. The combination of the parts of speech is not especially limited and may, for example, specify particular characters in the parts of speech such as "noun" "the preposition 'of'"+"noun". Further, the combination of the parts of speech may solely be comprised of "unknown morphemes".

The output unit 24 is an output section for displaying in the display screen, not shown, phrases determined by a verification unit 33 of the server 3 to not be accumulated in a phrase accumulation unit 32 and received via the interface 20 functioning as a data receiving section. The phrase displayed by the output unit 24 is the phrase newly accumulated by the phrase accumulation unit 32. The display screen in which the phrase is displayed by the output unit 24 can display the web page that includes text data from which the phrase is extracted upon input by the input unit 25 for selecting the displayed phrase.

The input unit 25 can select the phrase displayed on the display screen by the output unit 24. The input unit 25 can input a combinations of parts of speech of morphemes to be accumulated in the part-of-speech accumulation unit 31 of the server 3. In addition, the input unit 25 can be operated to have the terminal 2 or the server 3 execute a prescribed process. For example, a command can be input to display, in the display screen of the terminal 2, phrases or combinations of parts of speech of morphemes accumulated in the phrase accumulation unit 32 or the part-of-speech accumulation unit 31 of the server 3.

The terminal 2, under the control of a CPU (Central Processing Unit), not shown, through performing the prescribed program, realizes the function of each unit such as the search unit 21, the morphological analysis unit 22, the extraction unit 23, the output unit 24, the input unit 25, a search condition storage unit 26, etc.

Figure 3:
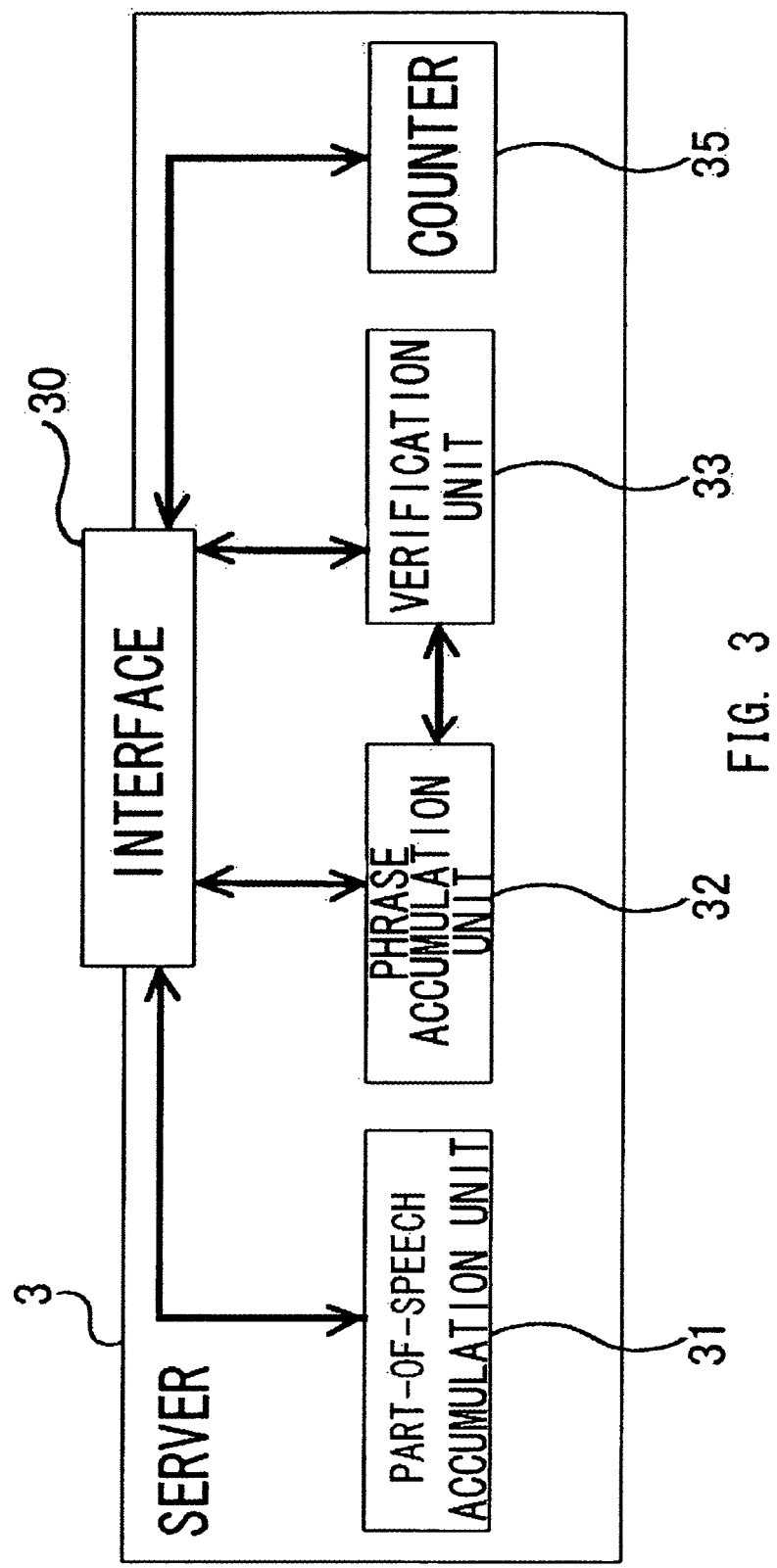
FIG. 3 is a block diagram showing the structure of the server of the data extraction system described in the first embodiment.

As shown in FIG. 3, the server 3 contains an interface 30, the part-of-speech accumulation unit 31, the phrase accumulation unit 32, the verification unit 33, and a counter 35.

The interface 30 connects the server 3 to the network. Information concerning phrases, parts-of-speech, images, sounds, and the like are sent to and received from the terminal 2 or the web server 4 via the interface 30 connected to the network 1.

The part-of-speech accumulation unit 31 is a part-of-speech accumulation section for accumulating the combinations of parts of speech of the morphemes for extraction of the phrases by the extraction unit 23 of the terminal 2. The part-of-speech accumulation unit 31, for example, accumulates combinations of parts-of-speech such as "noun"+"noun"+"noun". The part-of-speech accumulation unit 31 sends to the terminal 2 the accumulated combination of parts-of-speech of the morphemes via the interface 30 serving as a part-of-speech sending section. The combination of the parts of speech of the morphemes in the part-of-speech accumulation unit 31 can also be accumulated through input by the input unit 25 of the terminal 2. At this time, a list of combinations of parts of speech may be formed in advance, input may be entered into the input unit 25 to make a selection from the combinations of parts-of-speech of morphemes displayed in the list, and the selected combination may be accumulated in the part-of-speech accumulation unit 31. The combination of parts of speech of morphemes requested by the user can therefore be extracted.

The phrase accumulation unit 32 is a data accumulation section for accumulating phrases extracted by the extraction unit of the terminal 2. The phrase accumulation unit 32 receives the phrase extracted by the extraction unit 23 via the interface 30 serving as the data receiving section. The phrase accumulation unit 32 then, in a case where the verification unit 33 determines that the received phrase is not among the accumulated phrases, accumulates the phrase.

In addition, the phrase accumulation unit 32 associates the phrase with the URL (Uniform Resource Locator) of the web page that includes the text data of the extracted accumulated phrase and then accumulates this information. The URL may be sent to the terminal 2 along with the phrase sent by the verification unit 33 to be displayed on the display screen by the output unit 24 of the terminal 2, but, the URL may also be sent to the terminal 2 in accordance with the selection, made by the input unit 25, on the display screen of the terminal 2.

Further, the phrase accumulation unit 32 associates the phrase with the number of times that the phrase is selected by the input unit 25 of each of the terminals 2, the number of times being measured by the counter 35, and then accumulates this information. The number of times is sent to the terminal 2 by the counter 35 so that the number of times is displayed in a manner that the number of times is associated with the phrase displayed in the display screen of the terminal 2.

Yet further, concerning the phrases and such accumulated in the phrase accumulation unit 32, a response can be sent to the terminal 2 according to the operation input by the input unit 25 of the terminal 2. For example, in a case where a command is input from the input unit 25 of the terminal 2 to show the history of the accumulated phrases, the phrase accumulation unit 32 sends the history to the terminal 2 and the history can also be displayed on the display screen of the terminal 2. The selected phrases can also be displayed in the display screen of the terminal 2 in descending order of the number of times.

The verification unit 33 is a verification section for receiving the phrase extracted by the extraction unit 23 of the terminal 2 and verifying whether the phrase is already accumulated in the phrase accumulation unit 31. In a case where the result of the verification by the verification unit 31 is that the phrase is not already accumulated in the phrase accumulation unit 32, the phrase is stored in the phrase storage unit 32 and the phrase is sent to the terminal 2 via the interface 30 serving as the data sending section.

The counter 35 measures the number of times that the phrase displayed in the display screen of the terminal 2 is selected by the input unit 25. The number of times is associated with the phrase stored in the phrase accumulation unit and then accumulated. The counter 35 sends the measured number of times to the to the terminal 2 via the interface 30 so that the number of times is displayed in the display screen of the terminal 2 in a manner that the number of times is associated with the phrase.

The server 3, under the control of the CPU, not shown, through performing the prescribed program, realizes the function of each unit such as the part-of-speech accumulation unit 31, the phrase accumulation unit 32, the verification unit 33, a verification condition storage unit 34, and the counter 35.

The web server 4, as shown in FIG. 1, contains an interface, is connected to the server 3 and the terminal 2 via the network 1, and can send and receive information such as a web page. The web server 4 stores a web page including text data, images, sounds, and the like, the search unit 21 searches for the web page, and the terminal 2 receives the web page.

The operation of the data extraction system structured in the manner described above will be described using FIG. 4 through FIG. 6. First, the extraction of the phrase by the terminal 2 will be explained. The extraction is executed every time the terminal 2 receives one piece of text data and is repeated every time text data is received.

First, the search unit of the terminal 2 searches for web pages, resulting the search unit 21 receiving a web page including text data.

Figure 4:
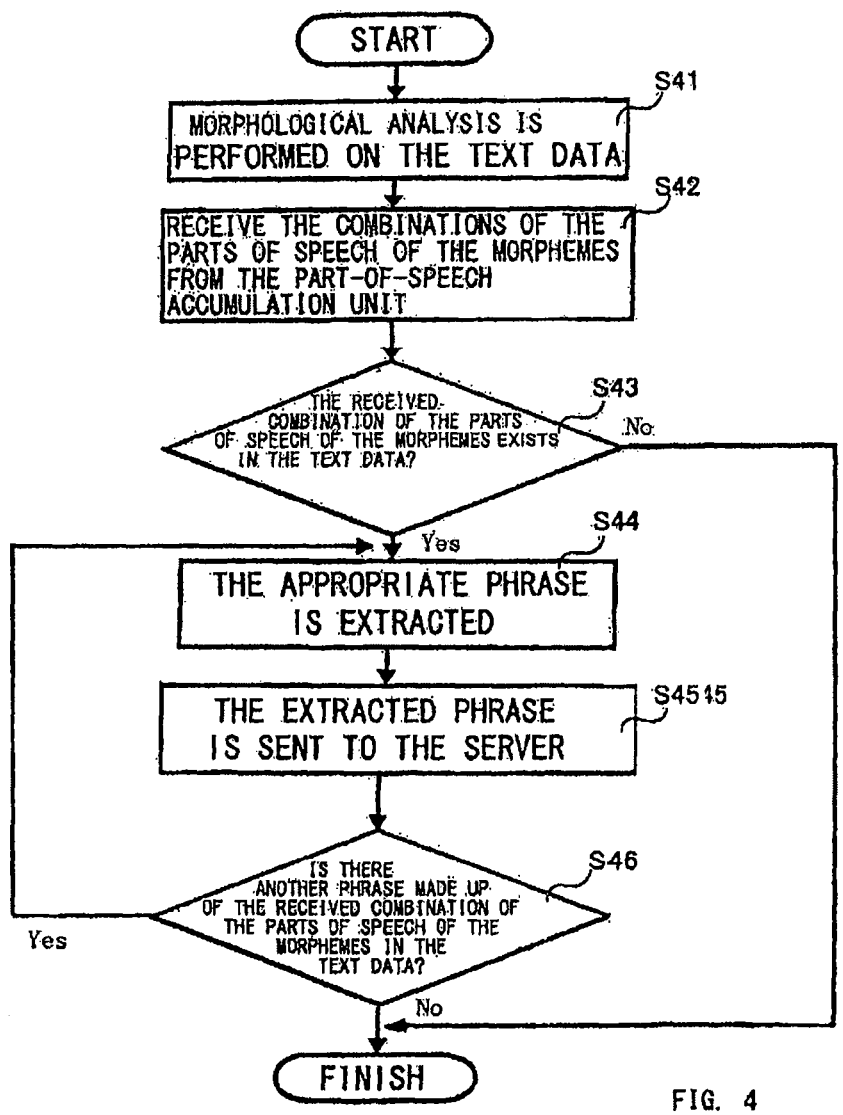
FIG. 4 is a diagram showing an example of a display screen described in the first embodiment.
Figure 5:
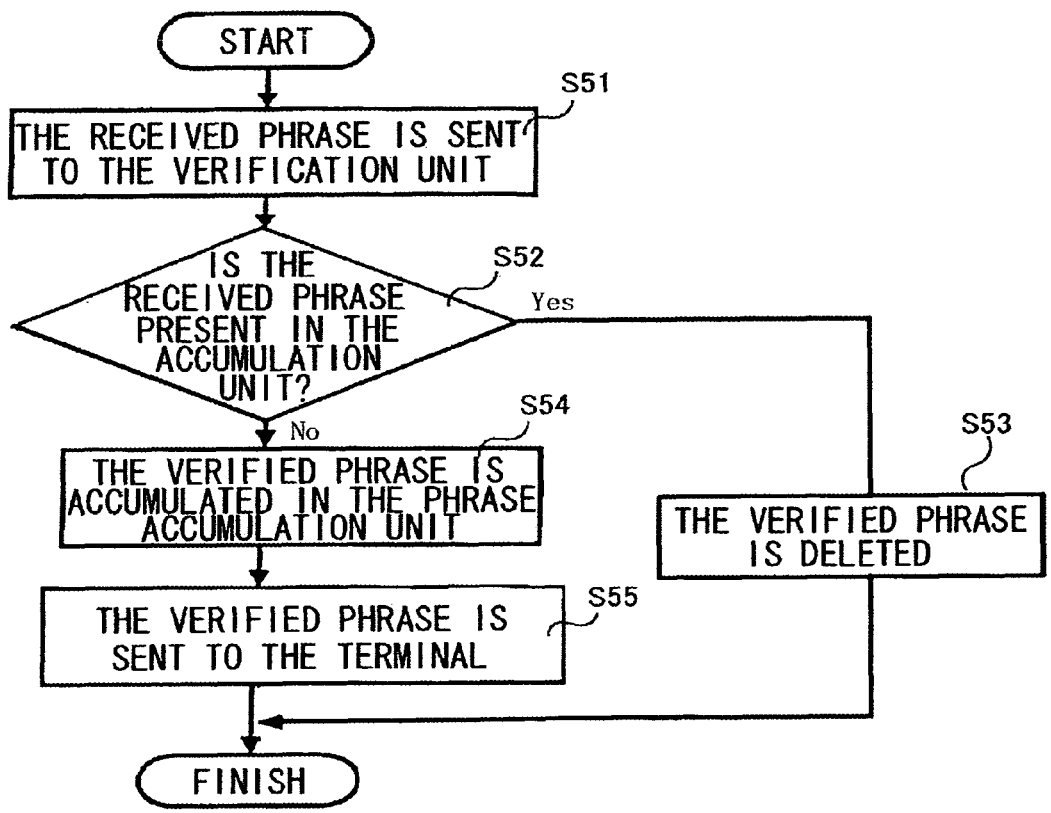
FIG. 5 is a flow chart showing the process of extracting a phrase from text data in the data extraction system described in the first embodiment.

Upon reception of the web page including the text data, the process shown in FIG. 4 is executed. As shown in step S41, the morphological analysis unit 22 of the terminal 2 performs morphological analysis on the text data of the received web page. The parts of speech of the morphemes in the text data is analyzed through the morphological analysis.

As shown in step S42, the extraction unit 23 then receives the accumulated combinations of the parts of speech of the morphemes from the part-of-speech accumulation unit 31 of the server 3 to extract from the text data the phrase whose morphemes are the prescribed combination of the parts of speech of the morphemes.

As shown in step S43, the extraction unit 23 confirms whether the phrase made up of the combination of parts of speech of the morphemes, identical to the combination of the parts of speech of the morphemes received from the part-of-speech accumulation unit 31 of the server 3, is present in the received text data. In a case where the result is that there is no phrase made up of the identical combination of the parts of speech of the morphemes, the extraction unit 23 finishes the process.

At step S43, in a case where there is a phrase made up of the identical combination of the parts of speech of the morphemes, the extraction unit 23, as shown in step S44, extracts the phrase in question. At this time, the extraction unit 23 associates the extracted phrase with the URL address of the web page that includes the text data from which the phrase was extracted.

As shown in step S45, the extraction unit 23 then sends the extracted phrase to the server 3 via the interface 20. As shown in step S46, the extraction unit 23 then confirms whether another phrase made up of the combination of parts of speech of the morphemes, identical to the combination of the parts of speech of the morphemes received from the part-of-speech accumulation unit 31 of the server 3, is present in the text data on which morphological analysis was performed.

At step S46, in a case where there is another phrase made up of the identical combination of parts of speech of the morphemes, the extraction unit 23 moves to step S44 and repeats the process until a phrase can no longer be extracted from the text data on which morphological analysis was performed. On the other hand, at step S46, in a case where there is not another phrase made up of the identical combination of parts of speech of the morphemes, the process is finished. At this time, the extraction unit 23 sends the phrase and the URL associated with the phrase to the server 3.

In the manner described above, the search unit 21 can automatically search for and extract the phrase made up of the prescribed combination of the parts of speech of the morphemes from the web page that includes the text data received from the web server 4.

Next, the verification of the phrase extracted by the extraction unit 23 of the terminal 2 and the sending of the phrase to the terminal 2 connected to the server 3 will be explained. The process is executed upon reception of a single phrase by the server 3 and is repeated for every reception of a phrase.

First, as shown in step S51, the server 3 sends the received phrase to the verification unit 33. As shown in step S52, the verification unit 33 then verifies whether the received phrase is present in the phrase accumulation unit 32. In a case where the result is that the received phrase is present in the phrase accumulation unit 32, the verification unit 33, as shown in step S53, erases the verified phrase and finishes the process.

At step S52, in a case where the result is that the received phrase is not present in the phrase accumulation unit 32, the verification unit 33, as shown in step S54, accumulates the verified phrase in the phrase accumulation unit 32. At this time, the verification unit 33 also accumulates the URL of the web page in a manner that the URL is associated with the phrase, the URL being received from the terminal 2 and including the text data from which the phrase is extracted.

As shown in step S55, the verification unit 33 then sends the verified phrase via the interface 30 to all of the connected terminals 2 to be displayed in the display screen by the output unit 24 of the terminal 2.

Figure 6:
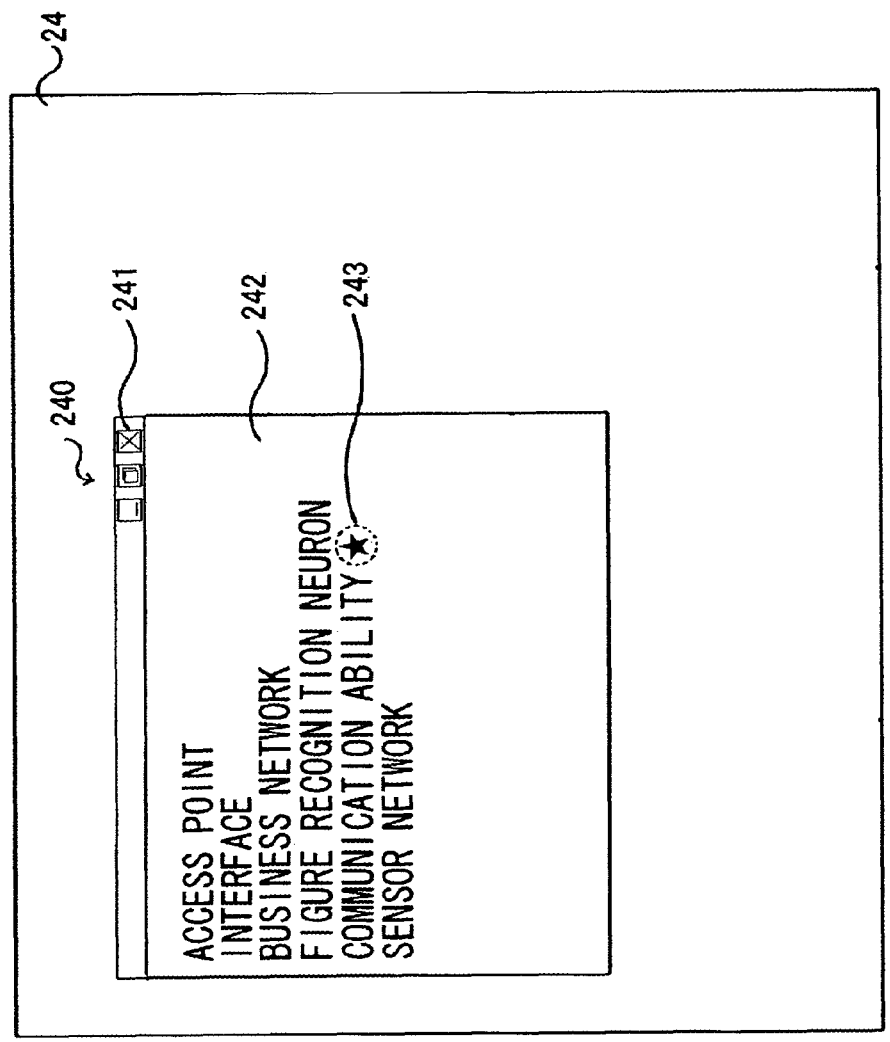
FIG. 6 is a flow chart showing the process of verifying the phrase with the verification section of the server of the data extraction system described in the first embodiment.

FIG. 6 is a diagram showing an example of the display screen displaying the received phrase. The terminal 2 that received the phrase from the server 3 via the interface 30 displays the phrase in a display area 240 of the display screen using the output unit 24. At this time, the output unit 24 displays the phrase in a phrase display section 242, arranged in the order in which the phrases are received. In the manner described above, the output unit 24 of the terminal 2 displays the phrase not accumulated in the phrase accumulation unit 32. That is, newly found phrases are displayed. In a case where there are many displayed phrases, a scroll bar or the like may be set on a side portion of the phrase display section 242 and the phrases may be displayed by scrolling in the phrase display section 242. In addition, the phrases may be erased in order from the top for every occasion when the new phrase is displayed.

The phrases displayed in the phrase display section 242 can be selected through the input unit 25. The output unit 24 sends to the search unit 21 the information input by the input unit 25 to select the phrase. The search unit 21 then receives, via the interface 20, the URL of the web page accumulated in the phrase accumulation unit 32 in a manner that the URL is associated with the selected phrase, the web page including the text data from which the selected phrase was extracted. The search unit 21 searches the web server 4 based on the received URL and receives the web page of the URL in question. The received web page is sent to the output unit 24 and is displayed on a new screen. The system enables the user to see how the extracted phrase is used. That is, the user can easily make use of the displayed phrase as a new phrase.

In a case where the phrase is selected through the input unit 24, the information concerning the selected phrase is sent to the server 3. Multiple terminals 2 are connected to the server 3, and the counter 35 measures the number of times that the phrase is selected by all of the terminals based on the selection information received from each of the terminals 2. The counter 35 then accumulates, as needed, the number of times the phrase is selected in the phrase accumulation unit 32 in a manner that the number of times is associated with the phrase.

In addition, the number of times that the phrase is selected is sent to the terminal 2 via the interface 30 in a manner that the number of times is associated with the phrase. Upon being sent, the number of times is passed to the output unit 24 and is displayed in the display screen in a manner that the number of times corresponds to the associated phrase. For example, as shown in FIG. 6, the number of times that the phrase is selected is displayed by attaching a star mark next to the associated phrase. In addition, the number of times may be described with a number. Further, the number of times may not necessarily be directly displayed by the star mark or number, but the frequency of selection based on the number of times may be displayed by a mark such as a length of a gauge or a number of stars. It can therefore be known what phrases are being focused on by the users.

Further, the combination of parts of speech of the morphemes sent to the extraction unit 23 of the terminal 2 from the part-of-speech accumulation unit 31 of the server 3 may be the combination of parts of speech of the morphemes requested by the user using the terminal 2. That is, the user using the terminal 2 requests the desired combination of parts of speech of the morpheme, via the input unit 25, from among the combinations of parts of speech of the morphemes accumulated in the part-of-speech accumulation unit 31 of the server 3. The server 3 then sends to the terminal 2 the combination of parts of speech of the morphemes requested by the terminal 2. In such a case, it is preferable that the phrase sent to the terminals 2 be sent only to one of the terminals 2 that requested the combination of parts of speech of the morphemes. Therefore, only the phrase made up of the combination of parts of speech of the morphemes in which the user is interested can be extracted, thus making the system easy to use for the user.

In the manner described above, the data extraction system of the present invention can distribute each process involved in the data extraction of the phrase as data between the server 3 and terminal 2, thereby decreasing the burden placed on each apparatus. For example, the burden placed on the server 3 does not increase in great order even if many terminals 2 are connected to the server 3.

The server 3 may also be equipped with the search unit 21 of the terminal 2. In such a case, the web page is searched for in the same manner as with the terminal 2. A process of searching a large number of web pages can therefore be further distributed between the terminal 2 and the server 3. The web page that is searched for may be sent to the terminal 2 via the interface 30, but the phrase may also be extracted from the sought web page by the server 3 equipped with the morphological analysis unit 22 and the extraction unit 23. The morphological analysis unit 22 and the extraction unit 23 in such a case are substantially the same as those equipped by aforementioned terminal 2. The search unit 21 performs the morphological analysis on the web page that is searched for in the same manner as the terminal 2. The extraction unit 23 receives the combination of parts of speech of the morphemes accumulated in the part-of-speech accumulation unit 31 inside the same server 3, and extracts the phrase, in the same manner as the extraction unit 23 of the terminal 2, based on the received combination of parts of speech of the morphemes. The extracted phrase is sent to the verification unit 33 of the server 3 and is verified. The server 3 can thereby extract the phrase in the same manner as the terminal 2.

In addition, as described in the first embodiment, the phrase extracted by the terminal 2 is verified by the server 3, and the new phrase extracted by the terminal 2 can be shared by all of the terminals 2 by having the verification results sent to the terminals 2 connected to the server 3. In such a case, it is not necessary for any one of terminals 2 to see all of the text data on web pages in the web server 4, and thus, the burden of extracting the phrase can be distributed among each of the terminals 2. Therefore, the burden placed on the terminal 2 is therefore further decreased.

Second Embodiment

The data extraction system described in the second embodiment is a system that uses terminals 2 equipped with a transmission unit 29 that can send and receive the phrase, verified by the server 3, among all of the terminals 2. The data extraction system will be described using FIG. 3 through FIG. 8. In addition, units that are the same as units described in the first embodiment will be given the same reference numerals and the explanation thereof will be omitted.

Figure 7:
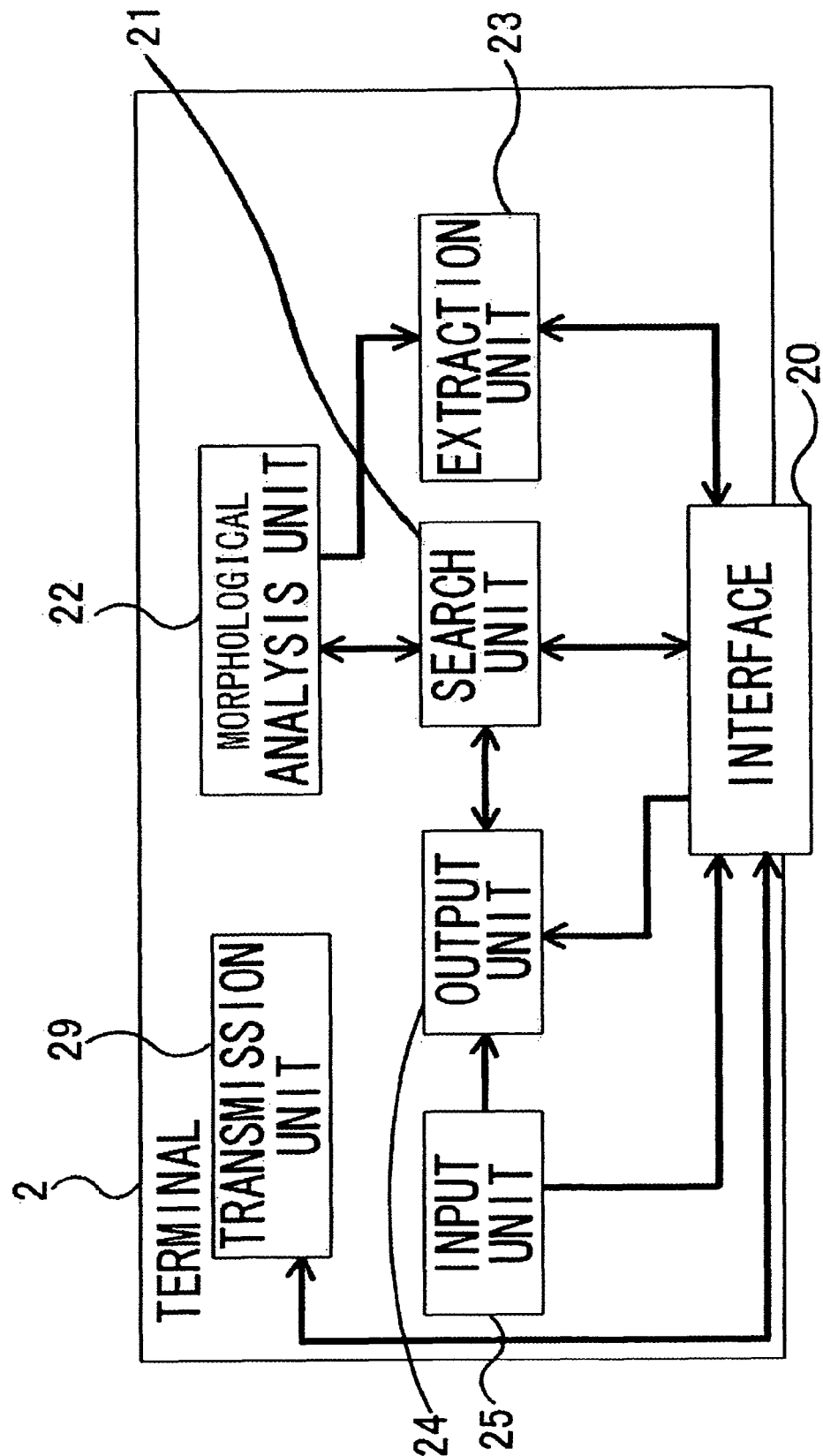
FIG. 7 is a block diagram showing the structure of the terminal of the data extraction system described in the second embodiment.

As shown in FIG. 7, the transmission unit 29 receives the phrase via the interface 20 at the time when the phrase received via the interface 20 is sent to the output unit 24. The transmission unit 29 then sends the received phrase so that other terminals 2 connected to the server 3 display the phase on the display screen by the output unit 24.

Figure 8:
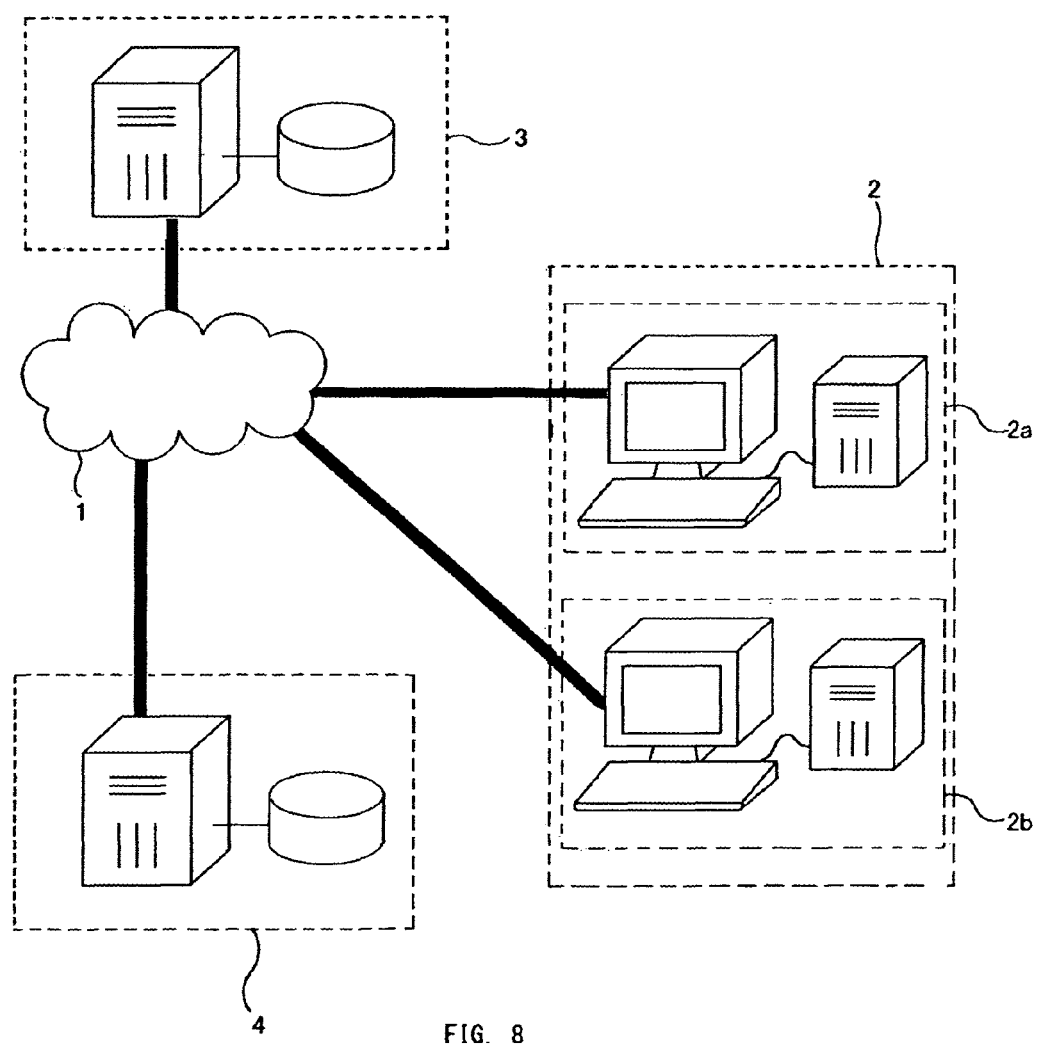
FIG. 8 is a diagram showing the network configuration of the data extraction system described in the second embodiment.

The data extraction system described in the second embodiment is formed by connecting multiple terminals 2 each containing the transmission unit 29 to the server 3. As shown in FIG. 8, in the data extraction system described in the second embodiment, a terminal 2a and a terminal 2b each equipped with the transmission unit 29 are connected to the server 3.

As described in the first embodiment, the phrase extracted by the terminal 2a is verified by the server 3. Then, in a case where it is verified that the phrase is not a phrase present in the phrase accumulation unit 32, the server 3 sends the phrase to only the terminal 2a that has extracted the phrase.

The phrase received via the interface 20 is sent to the output unit 24 and the transmission unit 29. The phrase, along with being displayed on the display screen by the output unit 24, is sent from the transmission unit 29 so that the other terminal 2b connected to the server 3 via the interface 20 displays the phrase again on the display screen by the output unit 24.

The phrase received from the terminal 2a is sent to the output unit 24 of the terminal 2b and is displayed in the display screen of the terminal 2b. At this time, in a case where there still is a terminal to which the phrase has not been sent yet among the terminals connected to the server 3 other than the terminals 2a and 2b, the terminal 2b sends the received phrase to the transmission unit 29 to transmit the phrase to such terminal that the phrase has not been sent yet, and the transmission of the phrase is repeated in the same manner for each of the terminals 2. At this time, the number of times that the phrase is selected, accumulated by the phrase accumulation unit 32 in a manner that the number of times is associated with the phrase, is also sent to each of the terminals 2 in the manner described above. The terminals 2 may be, for example, connected in a peer-to-peer manner to allow sharing of the phrase and the number of times the phrase is selected among the terminals 2. For example, the terminal 2b, upon confirming that another of terminals 2 connected for peer-to-peer sharing has not received the phrase, establishes a communication path with the another of terminals 2 and sends the phrase thereto. The terminals 2 connected for peer-to-peer sharing can therefore share with each other information concerning the phrase, the number of times the phrase is selected, and the like.

In the manner described above, the extracted new phrase can be shared by all of the terminals. The server 3 does not have to transmit the phrase to all of the terminals 2 because multiple terminals 2 are enabled to send and receive the phrase to be displayed to and from each other. In addition, one of the terminals 2 that receives the phrase does not have to send it to all of the terminals 2 connected to the server 3. That is, the phrase can be distributed by the terminals 2 connected to the server 3 and the burden placed on the terminals 2 and the server 3 can be decreased. In addition, the transmission speed of the phrase can be increased because the processes of the terminals 2 and server 3 are mitigated.

Third Embodiment

Figure 9:
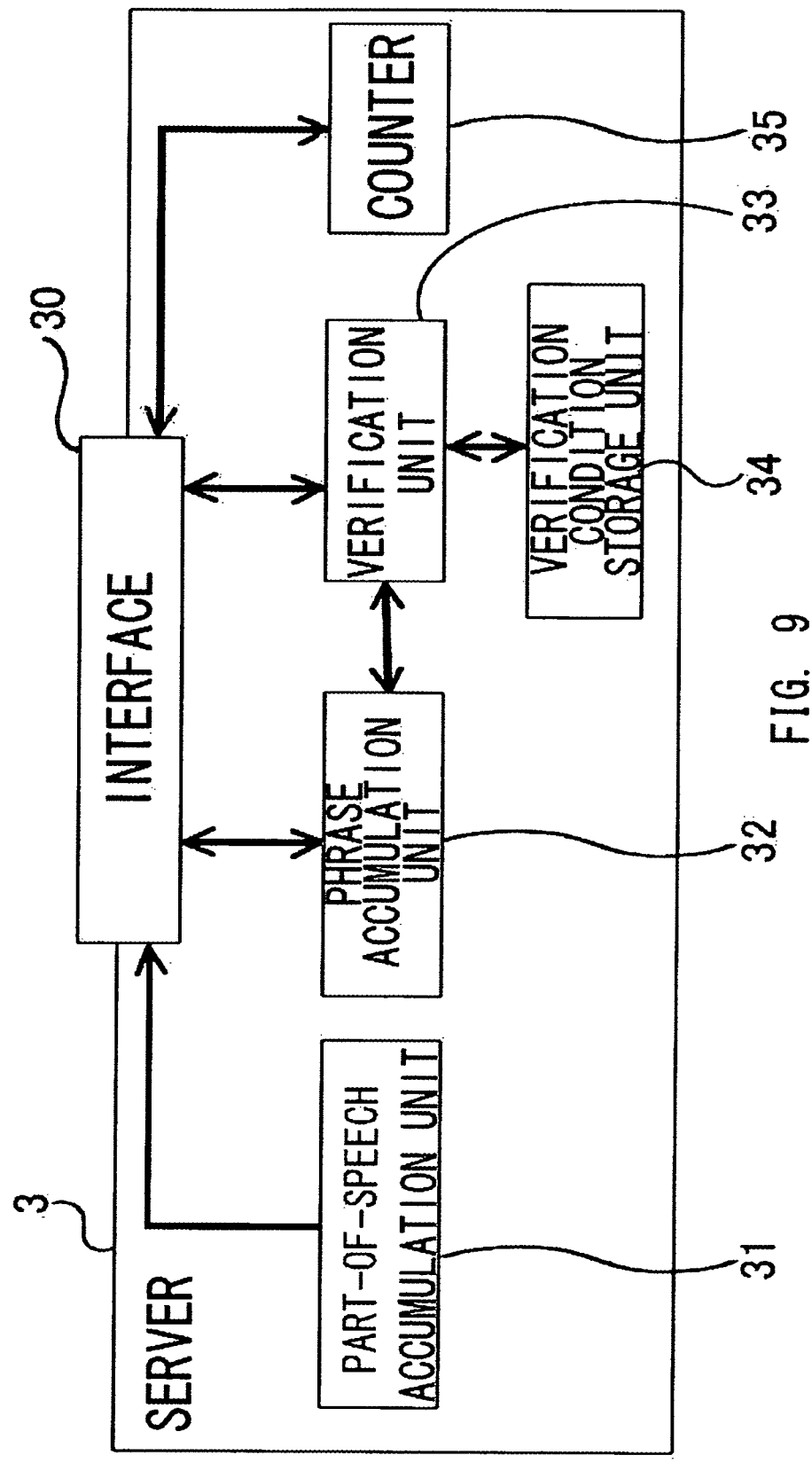
FIG. 9 is a block diagram showing the structure of the server of the data extraction system described in the third embodiment.

In the data extraction system described in the third embodiment, the server 3 sends to the terminals 2 only the phrase fulfilling a prescribed condition. That is, as shown in FIG. 9, the data extraction system of the third embodiment has a verification condition storage unit 34 in the server 3 in addition to the data extraction system of the first embodiment.

The verification condition storage unit 34 stores the condition for verification of the phrase by the verification unit 34. The verification condition storage unit 34 sends the stored verification condition to the verification unit 33 for every verification of the phrase. The verification unit 33 that receives the verification condition executes verification of the phrase based on the verification condition. In addition, the verification condition can be arbitrarily changed by input through the input unit 25 of the terminal 2.

An example of the condition for verification stored in the verification condition storage unit 34 will given in which only the phrase that the terminals have extracted and sent for a prescribed number of times or more is transmitted to the terminals 2. In such a case, the phrase accumulation unit 32 accumulates the phrase along with the number of times that the phrase is sent to the server 3 in a manner that the number of times is associated with the phrase. The verification unit 33 then verifies how many times the phrase is sent to the server 3, instead of verifying whether the phrase is present in the phrase accumulation unit 32, and the verification unit 33 sends to the terminals 2 only the phrase that has been sent from the terminals for the prescribed number of times or more so that the terminals 2 display the phrase in the display screen by the output unit 24.

For example, in a case where there is text data containing the phrase "pattern recognition neoron", a misspelling of "pattern recognition neuron", a judgment is made that the mistakenly written "pattern recognition neoron" is distinguished from the "pattern recognition neuron". Actually, the correctly written "pattern recognition neuron" is used more often, and the mistakenly written "pattern recognition neoron" is used a limited number of times. Here, the mistakenly entered "pattern recognition neoron" is not displayed on the display screen of the terminals 2 because only the phrases sent to the server 3 for the prescribed number of times or more is sent to the terminals 2. That is, only the phrase that fulfills the prescribed condition is displayed, and the mistakenly written phrase, acting as noise, is less likely to be displayed. Accordingly, a more appropriate phrase extraction is made possible.

At this time, using the URL of the web page, including the text data, accumulated in a manner that the URL is associated with the accumulated phrase, the phrase accumulation unit 32 can be enabled to avoid increasing the number of times the phrase is sent upon finding the phrase extracted from the text data having the same URL. A more appropriate data extraction is therefore made possible without extracting the phrase from the same text data.

Fourth Embodiment

Figure 10:
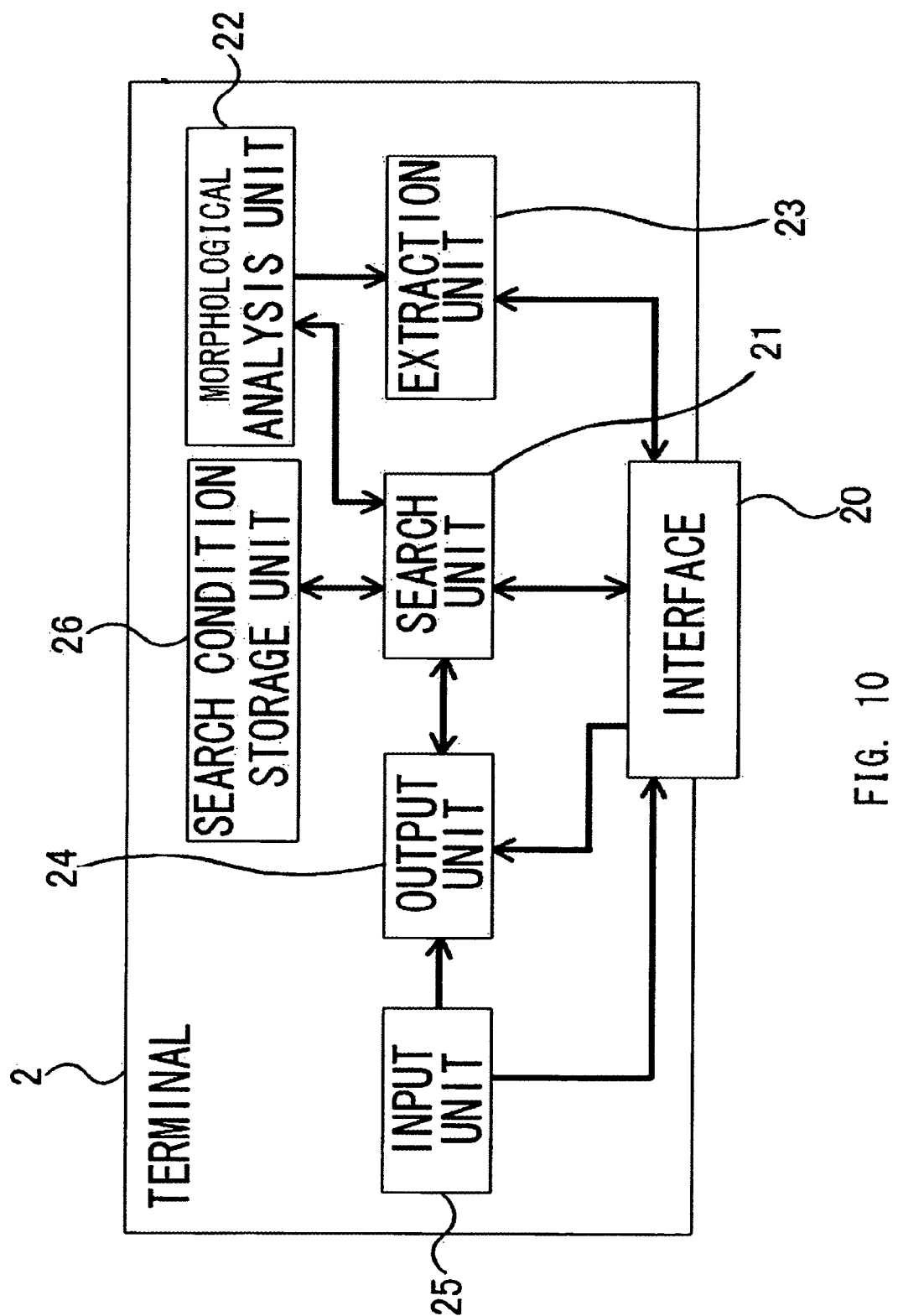
FIG. 10 is a block diagram showing the structure of the terminal of the data extraction system described in the fourth embodiment.

In the data extraction system described in the fourth embodiment, the terminal 2 receives only the text data that fulfills a prescribed condition. That is, as shown in FIG. 10, the data extraction system of the fourth embodiment has a search condition storage unit 26 in the terminal 2 in addition to the data extraction system described in the first embodiment.

The search condition storage unit 26 stores the condition of the search performed by the search unit 21 for the web page including the text data. The search condition storage unit 26 sends the search condition to the search unit 21 before the search unit 21 executes the search of the web server 4. The search unit 21 that receives the search condition executes the search for the web page including the text data based on the search condition. In addition, the search condition can be arbitrarily changed by input through the input unit 25 of the terminal 2.

An example of the search condition stored in the search condition storage unit 26 will be given in which the web page of a prescribed URL should not be received. In such a case, the prescribed URL is stored in the search condition storage unit 26 and the URL is sent along with the search condition to the search unit 21. The search unit 21 then executes the search for web pages based on the prescribed URL and the received search condition. At this time, the search unit 21 searches for the web page containing the text data while comparing the URL of the webpage of the server 4 to the URL received from the search condition storage unit 26.

The search unit 21 receives only the web pages where the URL of the web page of the server 4 and the URL received from the search condition storage unit 26 are not identical by having the search unit 21 search for the web page based on the search condition. The web pages that are identical are not received. That is, web pages where the URL of the web page of the server 4 and the URL received from the search condition storage unit 26 are identical can be excluded.

It is conceivable that a harmful web page exists that is merely sequential letter strings or phrases that are not commonly used, for a purpose of such as, e.g., filling up the phrases displayed in the display screen by the output unit 24 of the terminals 2 with meaningless letter strings or phrases. For example, it is possible that a web page including text data, which is formed of sequential meaningless phrases that resemble "pattern recognition neuron", such as "pattern recognition neoron" or "pattern recognition nearon", can be created on the web server 4. Upon receiving the web page mentioned above, the aforementioned type of meaningless phrase is extracted and displayed by the output unit 24 in the display screen. If such meaningless phrase is selected by the input unit 25, the web page that is merely sequential meaningless phrases will be displayed on the display screen by the output unit 24, and thus the meaning or a utilization method of the phrase cannot be known. In such a case, even if there is such a harmful web page, the terminals can prevent the meaningless phrase from being displayed by storing URL's of web pages that should not be received and by not receiving a web page having a URL identical to any one of the stored URL's. In addition, because the meaningless phrase is not displayed, the input unit 25 does not select the meaningless phrase, and the web page that is merely sequential meaningless phrases is avoided from being displayed on the display screen. That is, the phrase acting as noise is less likely to be displayed among the phrases displayed in the display screen by the output unit 24 of the terminal 2. Accordingly, more appropriate phrase extraction is made possible. Further, it is possible that only the web page containing the prescribed URL be received.

As another search condition, the URL of the web page can be used that is accumulated in the phrase accumulation unit 32 in the server 3 in a manner that the URL is associated with the accumulated phrase and that includes the text data from which the phrase is extracted. In such a case, as described above, it is possible for the web page containing the URL identical to the URL accumulated in the phrase accumulation unit 32 to not be received, so that duplicate phrase extraction at each of the terminals 2 can be avoided, and the burden placed on the terminals 2 can be decreased.

Yet further, using the URL of the web page that is accumulated in the phrase accumulation unit 32 in the server 3 in a manner that the URL is associated with the accumulated phrase and that includes the text data from which the phrase is extracted, the terminals can monitor the web pages having the URL's accumulated in the phrase accumulation unit 32 to see if the web pages are updated, and can receive only the web pages that have been updated. Therefore, the updated web pages can be efficiently received, and the burden placed on the terminals 2 can be decreased.

At the time of the update of the web page, the web server 4, using a ping or the like, for example, can transmit a notification of the updated status to a prescribed server and the like. Using the method above, the server 3 may be made to acquire the updated information notified by the use of the ping and the like. The search unit 21 of the terminal 2 that received the notification may then execute the search, so that the updated information of the web page can be quickly collected at a low cost. In addition, the notification may, for example, be retrieved from the server or the like that provides notification of the updated status of web pages by a ping or the like at every prescribed time.

As described in the first embodiment through the fourth embodiment, the phrase can be smoothly extracted with the data extraction system. The data extraction systems described in the first embodiment through the fourth embodiment are not each limited to the independent embodiments and it is possible to arbitrarily combine the embodiments by, for example, combining the first and fourth embodiments or the second and third embodiments.

In the data extraction system of the present invention, the morphological analysis unit 22 of the terminal 2 is not limited to performing morphological analysis only on the web page searched for by the search unit 21. For example, the morphological analysis can be performed on the text data input from the input unit 25 of the terminal 2 containing the morphological analysis unit 22. Therefore, for example, when the user tries to input a combination of parts of speech of morphemes of a certain phrase into the part-of-speech accumulation unit 31 of the server 3 via the input unit 25 of the terminal 2 but don't know the parts of speech of the phrase, the user can find out the combination of the parts of speech of the morphemes of the phrase by having the morphological analysis unit 22 of the terminal 2 perform the morphological analysis on the phrase input by the user. The resulting combination of parts of speech of the morphemes can also be accumulated in the part-of-speech accumulation unit 31 for more convenience.

In the data extraction system of the present invention, order of precedence for receiving web pages can be determined based on the number of views of the web page in the web server 4, which is acquired from the web server 4.

Further, the date and time as to when the phrase was verified by the verification unit 33 can be accumulated in the phrase accumulation unit 32 of the server 3 in a manner that the date is associated with the phrase to be accumulated. Therefore, for example, the phrases accumulated in the phrase accumulation unit 32 can be lined up on a time axis, through the input of the input unit 25. That is, a chart can be made that displays the appearance time of the phrase on the time axis.

Fifth Embodiment

The data extraction system of the present invention is not only for extracting only the phrase from the web page in the manner described above. For example, an image can be extracted as data in the same manner as described in the first embodiment through the fourth embodiment. The data extraction system described in the fifth embodiment that extracts images will be described referencing the diagrams.

Figure 11:
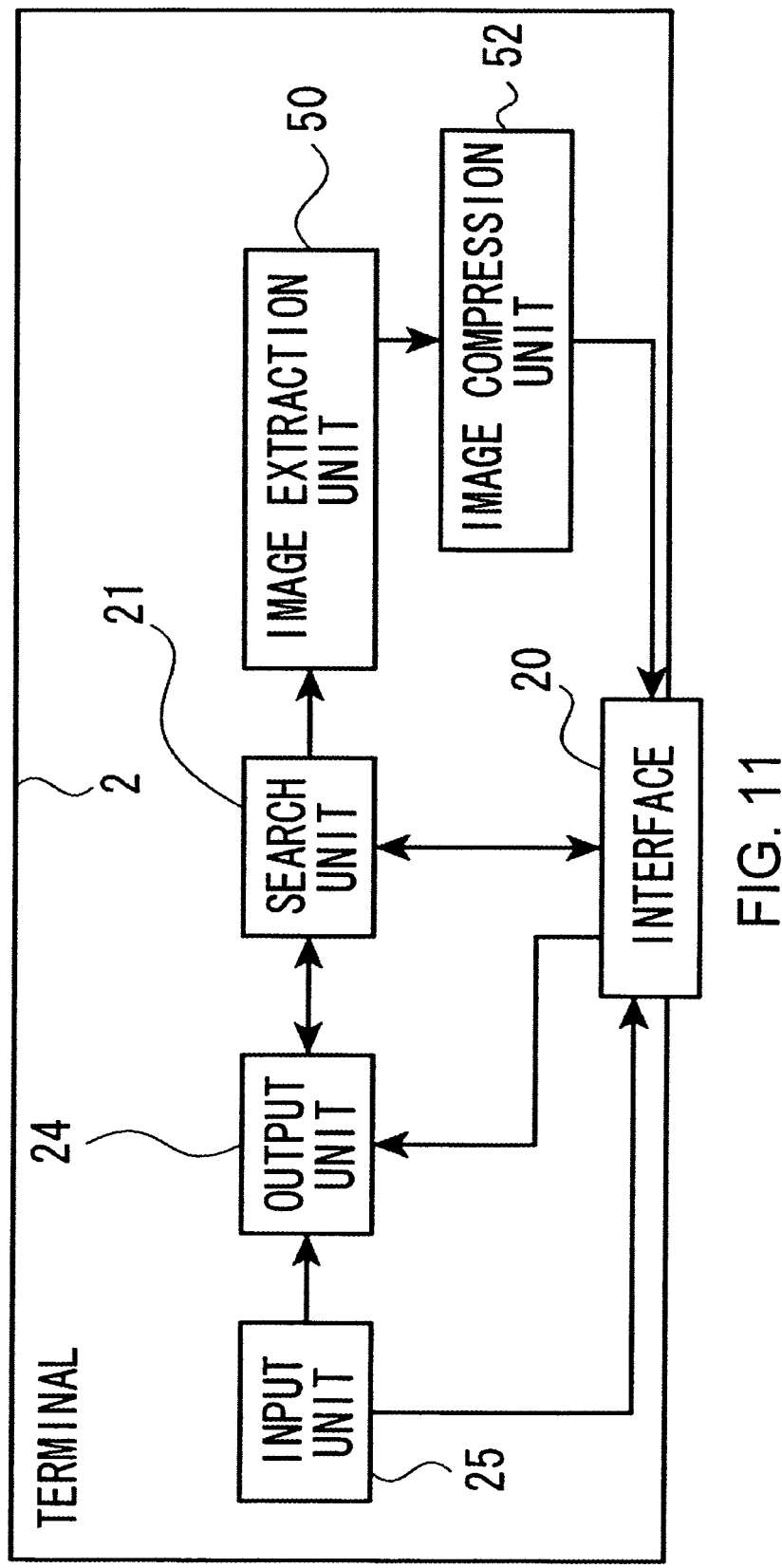
FIG. 11 is a block diagram showing the structure of the terminal of the data extraction system described in the fifth embodiment.
Figure 12:
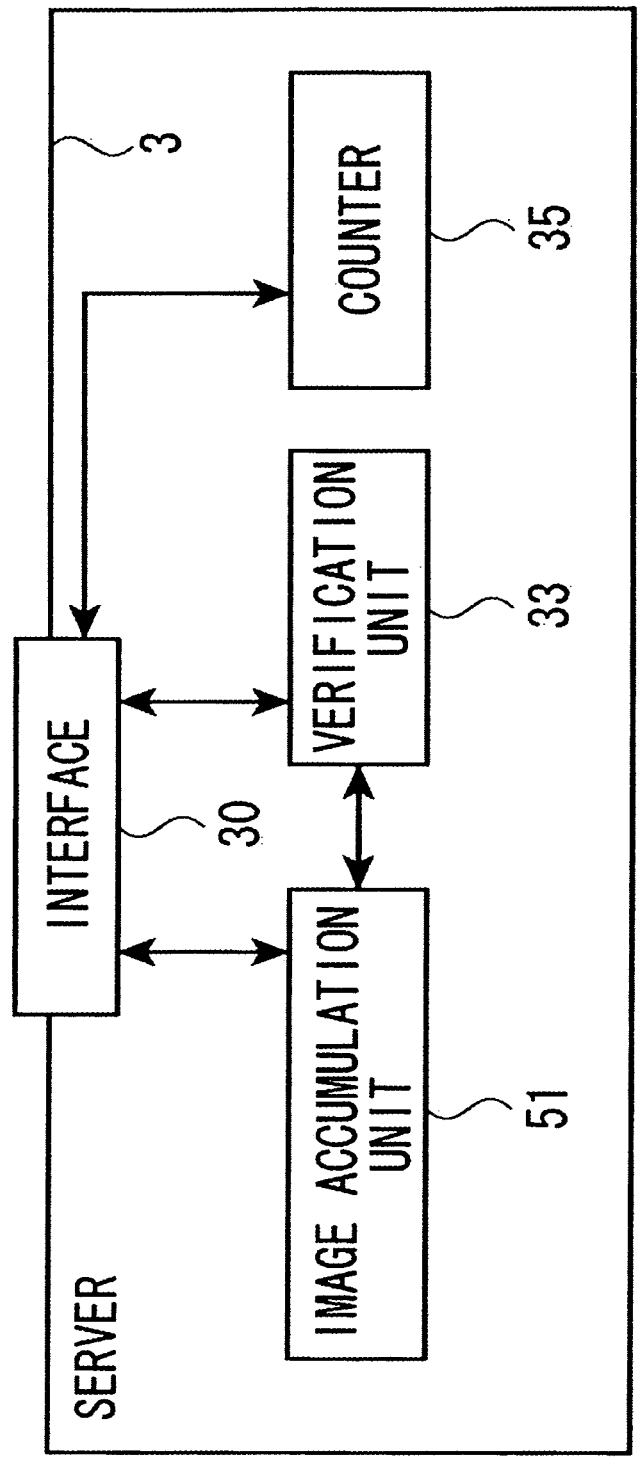
FIG. 12 is a block diagram showing the structure of the server of the data extraction system described in the fifth embodiment.

The data extraction system described in the fifth embodiment contains the terminal 2 and the server 3 in the same manner as the first embodiment. As shown in FIG. 11, in place of the extraction unit 23 of the first embodiment, the terminal 2 is equipped with an image extraction unit 50 as an extraction section for extracting the image and an image compression unit 52 as an image compression section for compressing the image extracted by the image extraction unit 50. As shown in FIG. 12, in place of the phrase accumulation unit 32 of the first embodiment, the server 3 is equipped with an image accumulation unit 51 as a data accumulation section for accumulating the images. In addition, units that are the same as units described in the first embodiment will be given the same reference numerals and the explanation thereof will be omitted.

The image extraction unit 50 extracts image data from the web page in the web server 4 searched for by the search unit 21. When the extracted image is sent to the server 3 via the interface 20 functioning as a data transmission section, the image extraction unit 50 passes the image to the image compression unit 52 to compress the image. At this time, the extracted image, which may be a still image or a moving image, may be a file of any extension as long as it is displayed in the web page as an image.

The image compression unit 52 compresses the image to a prescribed number of bytes. Upon receiving the image shown in FIG. 13, for example, from the image extraction unit 50, the image compression unit 52 shrinks the size of the image to 8×8 pixels, for example. The image is then reduced to 256 colors, for example. One pixel therefore becomes 8 bits and 256 colors and an image of 8×8 pixels becomes 64 bytes. In the manner described above, the image compression unit 52 compresses the image received from the image extraction unit 50 to the prescribed number of bytes by shrinking the image to the prescribed size and reducing the amount of colors, so that the number of bytes of the image is decreased. Accordingly, the burden placed on the network 1 is decreased when the image is sent to the server 3. The image compression unit 52 that compressed the image sends the compressed image to the server 3 via the interface 20. In a case where the compressed image is not used at the image verification of the verification unit 33 of the server 3, described later, the image compression unit 52 may be unequipped. In such a case, the image extracted by the image extraction unit 50 is sent unaltered to the server 3 via the interface 20.

The image accumulation unit 51 accumulates the image extracted by the image extraction unit 50 of the terminal 2 and compressed by the image compression unit 52. Further, the image accumulation unit 51 accumulates the information about the text strings, images, and the like corresponding to the image formed by the verification unit 33 in accordance with the image. The image accumulation unit 51 receives the image compressed by the image compression unit 52 via the interface 30. In a case where it is determined by the verification unit 33 that the received image is not present in the accumulated images, the image accumulation unit 51 accumulates the image. At this time, the large-sized image may be sent from the terminal 2 before being compressed by the image compression unit 52 and accumulated in the image accumulation unit to correspond to the compressed image.

In addition, the URL of the web page from which the accumulated image is extracted is associated with the image and accumulated in the image accumulation unit 51. To display the URL on the display screen through the output unit 24 of the terminal 2, the URL may be sent to the terminal 2 along with the information corresponding to the image sent by the verification unit 33, but also, the URL may be sent to the terminal 2 by a selection of the information corresponding to the image displayed in the display screen through the input unit 25.

Further, the image accumulation unit 51 associates with the image and stores the number of times the image is selected by the input unit 25 of the terminal 2, as measured by the counter 35. The number of times is sent to the terminal 2 by the counter 35 to be displayed and associated with the information corresponding to the image displayed in the display screen of the terminal 2.

Yet further, concerning the image and such accumulated in the image accumulation unit 51, a response can be sent to the terminal 2 according to the operation input by the input unit 25 of the terminal 2. For example, in a case where a command is input from the input unit 25 of the terminal 2 to show the history of the accumulated images, the image accumulation unit 51 sends the history to the terminal 2 and the history can also be displayed on the display screen of the terminal 2. The information corresponding to the image can also be displayed in the display screen of the terminal 2 in order starting from the largest number of times the image is selected.

In the data extraction system described in the fifth embodiment and structured in the manner described above, the search unit 21 of the terminal 2, first of all, searches for the web page and receives the web page that includes the image.

Upon receiving the web page that includes the image, the terminal 2 passes the web page to the image extraction unit 51 and the image in the web page is extracted. At this time, in the same manner as the first embodiment, the image extraction unit 50 associates the extracted image with the URL address of the web page from which the image was extracted. The image extraction unit 51 then passes the extracted image to the image compression unit 52 and the image is compressed to the prescribed number of bytes. The image compression unit 52 then sends the compressed image to the server 3 via the interface 20. At this time, the image extraction unit 50 sends the URL associated with the image to the server 3 along with the image. In a case where there are multiple images in the web page, the aforementioned process is repeated. In a case where no image to be extracted exist in the web page, the search unit 21 then searches for a new web page from the web server 4.

Upon receiving the image compressed by the image compression unit 52 from the connected terminal 2, the server 3 processes the image in the same manner as the phrase in the first embodiment. The server 3 sends the received image to the verification unit 33. The verification unit then verifies whether the received image is already accumulated in the image accumulation unit 51.

The image accumulated in the image accumulation unit 51 is an image that is compressed to the prescribed number of bytes by the image compression unit 52 of the terminal 2. For example, in a case where the image is compressed to 256 colors and 8×8 pixels, the verification unit compares the color of every pixel and verifies the correspondence between the image sent by the verification unit 33 and the image accumulated in the image accumulation unit 51. The verification method of the verification unit 33 is not particularly limited and can be arbitrarily altered according to the compression method or compression rate.

In a case where the result of the verification by the verification unit 33 is that the image received by the server 3 is already accumulated in the image accumulation unit 51, the verification unit 33 deletes the verified image. On the other hand, in a case where the image received by the server 3 is not in the image accumulation unit 51, the verification unit 33 forms the information of the character, image, or the like corresponding to the verified image and accumulates this information along with the verified image in the image accumulation unit 51. At this time, the verification unit 33 also accumulates the URL, which is associated with the image, of the web page from which the image received from the terminal 2 is extracted.

The verification unit 33 then sends the information corresponding to the verified image to all of the connected terminals 2 via the interface 30 to display the information in the display screen through the output unit 24 of the terminal 2.

By inputting, through the input unit 25, the selection of the information corresponding to the image displayed in the display screen, the terminal 2 receives the URL of the image corresponding to the information displayed in the display screen from the image accumulation unit 51 of the server 3. The search unit 21 then searches for the web page based on the received URL. At this time, the search unit 21 may simply display the web page in the manner that the webpage containing the extracted phrase is displayed in the first embodiment, but it is also possible that the image in the web page be received and displayed on the display screen by the output unit 24.

In the manner described above, the data extraction system described in the fifth embodiment can extract the image as data in place of the phrase extracted in the first embodiment. Therefore, new images formerly not found in web pages, for example, can be found from a web page on the web that has been updated or newly made.

Further, by compressing the extracted image, the size of the image is decreased and the verification unit 33 of the server 3 can quickly, and in large amounts, verify the correspondence between the images accumulated in the image accumulation unit 51 and the images extracted and compressed by the terminal 2. Accordingly, a large amount of data extracted from the web page can be quickly processed in large amounts.

The information corresponding to the image formed by the verification unit 33 is not particularly limited and may be in any form as long as it can be output to be displayed by the output unit 24 in the display screen of the terminal 2. For example, a portion of the URL accumulated and associated with the compressed image or the file name of the compressed image may be used, or the compressed image verified by the verification unit 33 may be directly displayed.

In the same manner as the first embodiment, the server 3 containing the image accumulation unit 51 may be equipped with the search unit 21 of the terminal 2. In such a case the server 3 can search for the web page in the same manner along with the terminal 2. Therefore, the process of searching for a large amount of web pages can be further distributed between the terminal 2 and the server 3. The web page that is searched for may be sent to the terminal 2 via the interface 30, but the server 3 may also be equipped with the extraction unit 23 and may extract the image from the web page that is searched for inside the server 3 in the same manner as the extraction unit 23 of the terminal 2.

The data extraction system described in the fifth embodiment may be combined with the first embodiment through fourth embodiment to extract both images and phrases. In such a case, the image extraction unit 50, the image compression unit 52, and the image accumulation unit 51 are newly equipped by the data extraction system described in the first through fourth embodiments and the image and phrase can be extracted from the web page by having the image extracted in the manner described above.

Sixth Embodiment

The data extraction system of the present invention is not only for extracting only the phrase from the web page in the manner described above. For example, a sound can be extracted as data in the same manner as described in the first embodiment through the fourth embodiment. The data extraction system described in the sixth embodiment that extracts sound will be described referencing the diagrams.

Figure 13:
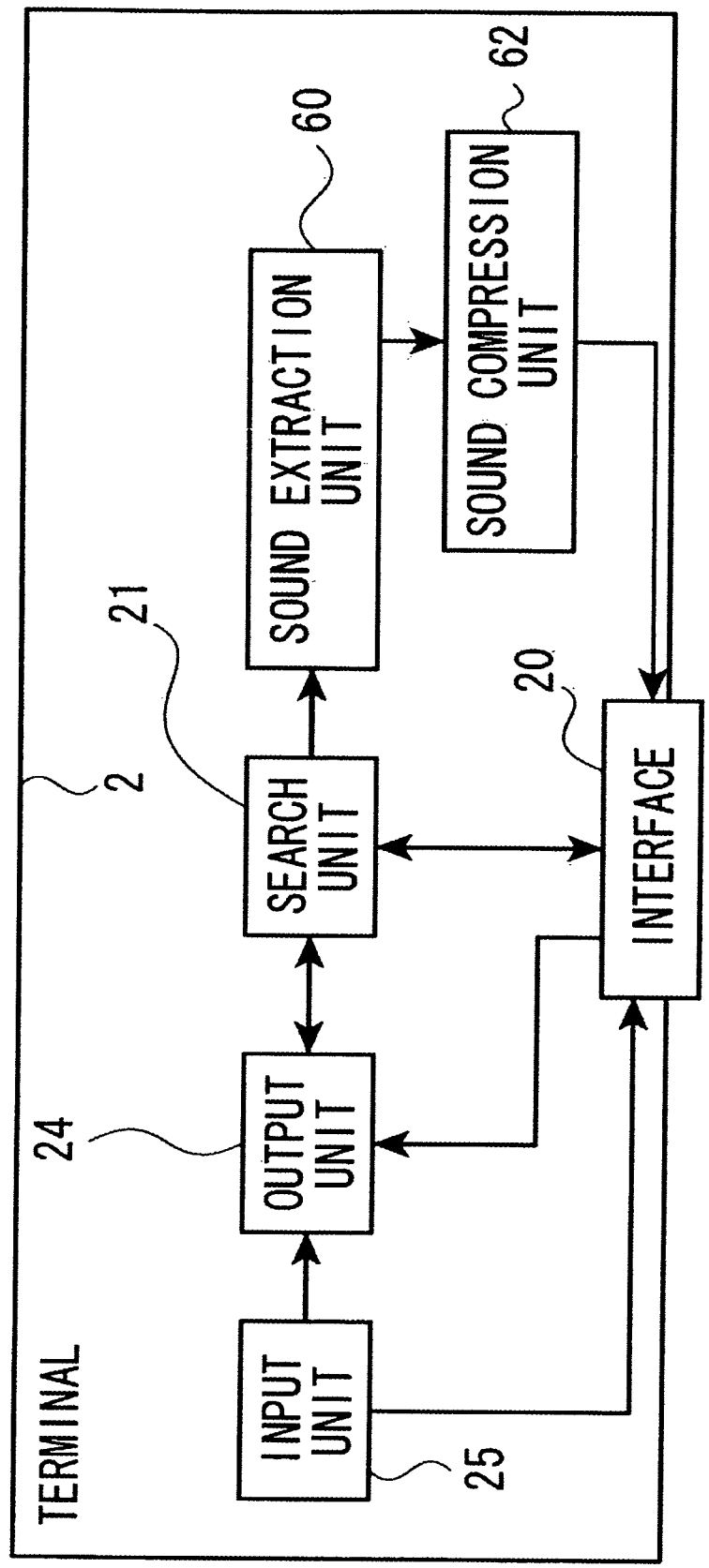
FIG. 13 is a block diagram showing the structure of the terminal of the data extraction system described in the sixth embodiment.
Figure 14:
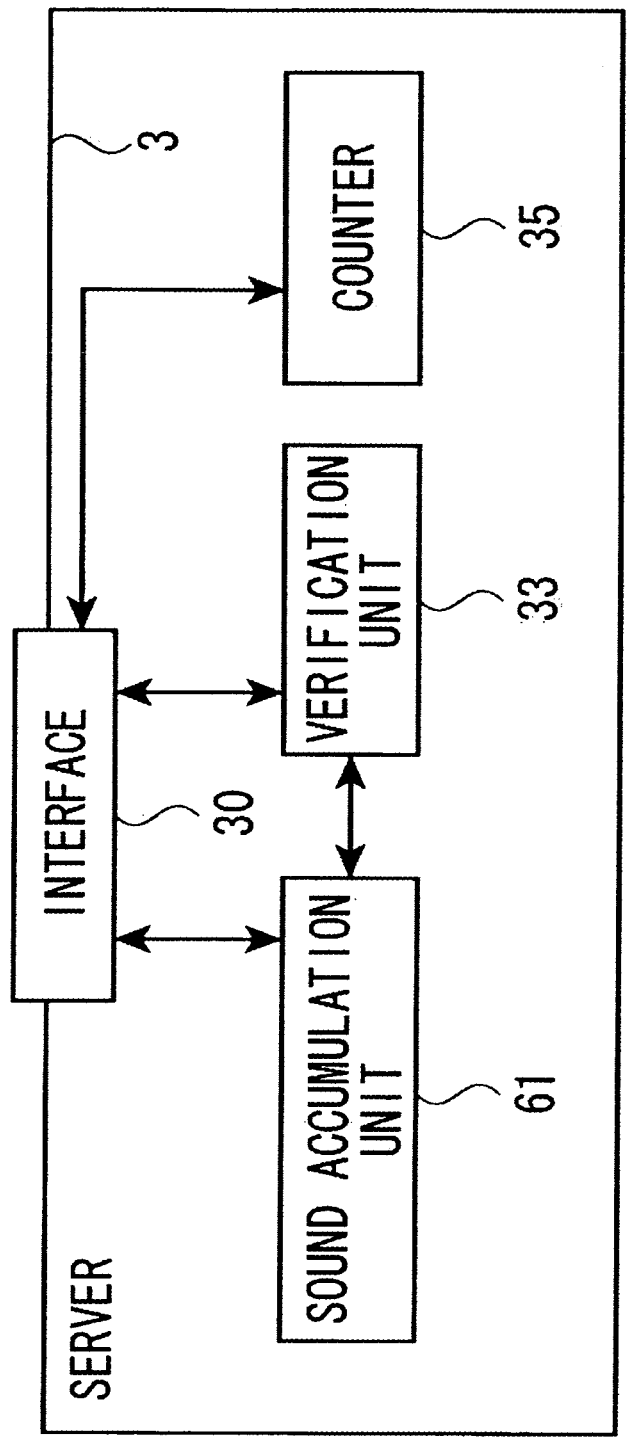
FIG. 14 is a block diagram showing the structure of the server of the data extraction system described in the sixth embodiment.

The data extraction system described in the sixth embodiment contains the terminal 2 and the server 3 in the same manner as the first embodiment. As shown in FIG. 13, in place of the extraction unit 23 of the first embodiment, the terminal 2 is equipped with a sound extraction unit 60 as an extraction section for extracting the sound and a sound compression unit 62 as a sound compression section for compressing the sound extracted by the sound extraction unit 60. As shown in FIG. 14, in place of the phrase accumulation unit 32 of the first embodiment, the server 3 is equipped with a sound accumulation unit 61 as a data accumulation section for accumulating the sounds. In addition, units that are the same as units described in the first embodiment will be given the same number and the explanation will be omitted.

The sound extraction unit 60 extracts sound data from the web page in the web server 4 searched for by the search unit 21. When the extracted sound is sent to the server 3 via the interface 20 functioning as a data transmission section, the sound extraction unit 60 passes the sound to the sound compression unit 62 to compress the sound. At this time, the extracted sound may be a file of any extension as long as it is displayed in the web page as a sound.

The sound compression unit 62 compresses the sound to the prescribed number of bytes. For example, upon receiving the sound from the sound extraction unit 60, the sound compression unit 62 samples the sound to, for example, thin out the sampling information included in the sound file and the sound is compressed to a degree of 64 samples by time-scale compression. Therefore, the bit strings compared by the verification unit 33 are decreased and the burden placed on the network 1 when the sounds is sent to the server 3 is also decreased. The sound compression unit 62 that compresses the sound sends the compressed sound to the server 3 via the interface 20. In a case where the compressed sound is not used in the sound verification performed at the verification unit 33 of the server 3, described later, the sound compression unit 62 may be unequipped. In such a case, the sound extracted by the sound extraction unit 60 is sent unaltered to the server 3 via the interface 20.

The sound accumulation unit 61 accumulates the sound extracted by the sound extraction unit 60 of the terminal 2 and compressed by the sound compression unit 62. Further, the sound accumulation unit 61 accumulates the information about the text strings, images, and the like corresponding to the sound formed by the verification unit 33 in accordance with the sound. The sound accumulation unit 61 receives the sound compressed by the sound compression unit 62 via the interface 30. In a case where it is determined by the verification unit 33 that the received sound is not present in accumulated sounds, the sound accumulation unit 61 accumulates the sound. At this time, the large-sized uncompressed sound before being compressed by the sound compression unit 62 may be sent from the terminal 2 and accumulated in the sound accumulation unit to correspond to the compressed sound.

In addition, the URL of the web page from which the accumulated sound is extracted is accumulated in the sound accumulation unit 61 in a manner that the URL is associated with the sound. To display the URL on the display screen through the output unit 24 of the terminal 2, the URL may be sent to the terminal 2 along with the information corresponding to the sound sent by the verification unit 33, but also, the URL may be sent to the terminal 2 by a selection of the information corresponding to the sound displayed in the display screen through the input unit 25.

Further, the sound accumulation unit 61 stores the number of times the sound is selected by the input unit 25 of the terminal 2, as measured by the counter 35, in a manner that the number of times is associated with the sound. The number of times is sent to the terminal 2 by the counter 35 to be displayed in the display screen of the terminal 2 in a manner that the number of times is associated with the information corresponding to the sound.

Yet further, a response in connection with the sound and the like accumulated in the sound accumulation unit 61 can be sent to the terminal 2 according to the operation input by the input unit 25 of the terminal 2. For example, in a case where a command is input from the input unit 25 of the terminal 2 to show the history of the accumulated sounds, the sound accumulation unit 61 can also the history to the terminal 2 so that the history is displayed on the display screen of the terminal 2. The information corresponding to the sound can also be displayed in the display screen of the terminal 2 in descending order of the number of times.

In the data extraction system structured as described hereinabove in the sixth embodiment, the search unit 21 of the terminal 2, first of all, searches for web pages and receives a web page that includes a sound.

Upon receiving the web page that includes the sound, the terminal 2 passes the web page to the sound extraction unit 60 and the sound in the web page is extracted. At this time, in the same manner as the first embodiment, the sound extraction unit 60 associates with the extracted sound the URL address of the web page from which the sound was extracted. The sound extraction unit 60 then passes the extracted sound to the sound compression unit 62, and the sound is compressed. The sound compression unit 62 then sends the compressed sound to the server 3 via the interface 20. At this time, the sound extraction unit 60 sends the URL associated with the sound to the server 3 along with the sound. In a case where there are multiple sounds in the web page, the aforementioned process is repeated. In a case where no sounds to be extracted exist in the web page, the search unit 21 then searches for a new web page from the web server 4.

Upon receiving the sound compressed by the sound compression unit 62 from the connected terminal 2, the server 3 processes the sound in the same manner as the phrase in the first embodiment. The server 3 sends the received sound to the verification unit 33. The verification unit then verifies whether the received sound is already in the sound accumulation unit 61.

Not only the sound accumulated in the sound accumulation unit 61 but also the sound sent to the verification unit 33 is a sound compressed by the sound compression unit 62 of the terminal 2. For example, in a case where the sound is compressed to approximately 64 samples, the correspondence between the sound sent to the verification unit 33 and the sound accumulated in the sound accumulation unit 61 is verified by comparing the bit strings made by the compression. The verification method of the verification unit 33 is not particularly limited and can be arbitrarily altered according to the compression method or the like.

In a case where the result of the verification by the verification unit 33 is that the sound received by the server 3 is already in the sound accumulation unit 61, the verification unit 33 deletes the verified sound. On the other hand, in a case where the sound received by the server 3 is not yet in the sound accumulation unit 61, the verification unit 33 forms the information of the text strings, sound, or the like corresponding to the verified sound and accumulates this information along with the verified sound in the sound accumulation unit 61. In addition, the verification unit 33 also accumulates the URL, which is associated with the sound, of the web page from which the sound received from the terminal 2 was extracted.

The verification unit 33 then sends the information corresponding to the verified sound to all of the connected terminals 2 via the interface 30 to display the information in the display screen through the output unit 24 of each of the terminals 2.

The terminal that receives the sound verified by the verification unit 33 and the information corresponding to the sound passes the information corresponding to the sound to the output unit 24. The output unit 24 that receives the information corresponding to the sound displays the information on the display screen. Thus, the sound can be extracted as data in place of the phrase that is extracted in the first embodiment. Therefore, new sounds formerly not found in web pages, for example, can be found from web pages on the web that has been updated or newly made.

By inputting, through the input unit 25, the selection of the information corresponding to the sound displayed in the display screen, the terminal 2 receives the URL of the sound corresponding to the information displayed in the display screen from the sound accumulation unit 61 of the server 3. The search unit 21 then searches for the web page based on the received URL. At this time, the search unit 21 may simply display the web page in the manner that the webpage containing the extracted phrase is displayed in the first embodiment, but it is also possible that the sound in the web page be received and output through a speaker by the output unit 24.

Further, by compressing the extracted sound, the size of the sound is decreased and the verification unit 33 of the server can quickly, and in large amounts, verify the correspondence between the sound accumulated in the sound accumulation unit 61 and the sound extracted and compressed by the terminal 2. Accordingly, a large amount of data extracted from the web page can be quickly processed.

The information corresponding to the sound formed by the verification unit 33 is not particularly limited and may be in any form as long as it can be output to be displayed by the output unit 24 in the display screen of the terminal 2. For example, a portion of the URL accumulated in a manner as to be associated with the compressed sound or the file name of the compressed sound may be used.

In the same manner as the first embodiment, the server 3 containing the sound accumulation unit 61 may be equipped with the search unit 21 of the terminal 2. In such a case the server 3 can search for the web page in the same manner along with the terminal 2. Therefore, the process of searching a large amount of web pages can be further distributed between the terminal 2 and the server 3. The web page that is searched for may be sent to the terminal 2 via the interface 30, but the server 3 may also be equipped with the extraction unit 23 and may extract the sound from the web page that is searched for inside the server 3 in the same manner as the extraction unit 23 of the terminal 2.

The data extraction system described in the sixth embodiment may be combined with the first embodiment through fifth embodiment to extract sounds and phrases or sounds, phrases, and images. In such a case, the sound extraction unit 60, the sound compression unit 62, and the sound accumulation unit 61 are additionally equipped by the data extraction system described in the first through fifth embodiments, and thus, the sounds and phrases or sounds, phrases, and images can be extracted from the web page by having the sound extracted in the manner described above.

What is claimed is:

1. A data extraction system for extracting and accumulating prescribed data from web pages on the web, the data extraction system comprising:
   a plurality of terminals; and
   a server connected to the plurality of terminals,
   wherein the server comprises:
      a first processor; and
      a first memory including a first set of executable instructions that, when executed by the first processor, cause the first processor to perform first operations including:
         receiving the prescribed data extracted by at least one of the plurality of terminals;
         accumulating the prescribed data, extracted by the at least one of the plurality of terminals, with extracted data; and
         verifying whether the prescribed data, extracted by the at least one of the plurality of terminals, is already accumulated with the extracted data, the prescribed data being accumulated with the extracted data when the prescribed data is determined to not be already accumulated with the extracted data, and
   wherein each of the plurality of terminals comprises:
      a second processor; and
      a second memory including a second set of executable instructions that, when executed by the second processor, cause the second processor to perform second operations including:
         searching for one of the web pages on the web;
         extracting the prescribed data from the one of the web pages;
         sending the prescribed data extracted from the one of the web pages to the server;
         receiving, from the server, one of the prescribed data and information corresponding to the prescribed data only when the prescribed data is determined by the server to not be already accumulated with the extracted data and after the prescribed data is accumulated with the extracted data and not when the prescribed data is determined by the server to be already accumulated with the extracted data; and
         outputting the one of the prescribed data and the information corresponding to the prescribed data.

2. The data extraction system according to claim 1, wherein each of the plurality of terminals receives the prescribed data in advance.

3. The data extraction system according to claim 1, wherein the server sends the prescribed data to each of the plurality of terminals when the first processor determines the prescribed data to not be already accumulated with the extracted data and after the prescribed data is accumulated with the extracted data.

4. The data extraction system according to claim 1, wherein
   the server sends the prescribed data to one of the plurality of terminals that extracted the prescribed data when the first processor determines the prescribed data to not be already accumulated with the extracted data and after the prescribed data is accumulated with the extracted data, and
   the one of the plurality of terminals receives the prescribed data from the server and sends the prescribed data to an other of the plurality of terminals.

5. The data extraction system according to claim 1, wherein the prescribed data is input by one of the plurality of terminals.

6. The data extraction system according to claim 1, wherein the server sends, to one of the plurality of terminals, prescribed data fulfilling a predetermined condition from among multiple prescribed data extracted by the one of the plurality of terminals.

7. The data extraction system according to claim 1, wherein each of the plurality of terminals receives one of the web pages that fulfills a predetermined condition.

8. The data extraction system according to claim 1, wherein the server sends, to one of the plurality of terminals, the prescribed data in response to a request from the one of the plurality of terminals.

9. The data extraction system according to claim 1, wherein each of the plurality of terminals selectably displays the prescribed data on a display screen.

10. The data extraction system according to claim 9, wherein the server calculates a number of times that the prescribed data is selected and sends the number of times to each of the plurality of terminals for displaying the number of times on the display screen in association with the prescribed data selectably displayed on the display screen.

11. The data extraction system according to claim 2, wherein the prescribed data is an image.

12. The data extraction system according to claim 11, wherein
the second processor compresses the image to a prescribed number of bytes by decreasing a size and a number of colors of the image, and
the server receives the image compressed by the second processor, accumulates the image, and verifies whether the image is already accumulated based on bit strings of the image compressed by the second processor.

13. The data extraction system according to claim 1, wherein the prescribed data is a sound.

14. The data extraction system according to claim 13, wherein
the second processor compresses a time-scale of the sound, and
the server receives the sound compressed by the second processor, accumulates the sound, and verifies whether the sound is already accumulated based on bit strings of the sound compressed by the second processor.

15. The data extraction system according to claim 1, wherein the prescribed data is text.

16. The data extraction system according to claim 1, wherein the prescribed data is a phrase.

17. A terminal apparatus connected to a server and used by a data extraction system for extracting prescribed data from web pages on the web, the terminal apparatus controlled by a processor and comprising:
a searcher, controlled by the processor, for searching for one of the web pages on the web;
an extractor, controlled by the processor, for extracting the prescribed data from the one of the web pages;
a data sender, controlled by the processor, for sending the prescribed data extracted by the extractor to the server;
a data receiver, controlled by the processor, for receiving, from the server, upon a verification of whether the prescribed data sent by the data sender is already accumulated with extracted data by a data accumulator of the server, one of the prescribed data and information corresponding to the prescribed data only when the prescribed data is determined to not be already accumulated with the extracted data by the data accumulator and after the data accumulator accumulates the prescribed data with the extracted data and not when the prescribed data is determined to be already accumulated with the extracted data; and
an output, controlled by the processor, for outputting the one of the prescribed data and the information corresponding to the prescribed data received by the data receiver.

18. A non-transitory computer-readable medium embodying a program for a terminal apparatus connected to a server and used by a data extraction system for extracting prescribed data from web pages on the web, the program comprising:
a search process for searching for one of the web pages on the web;
an extraction process for extracting the prescribed data from the one of the web pages;
a data sending process for sending the prescribed data extracted by the extraction process to the server;
a data reception process for receiving, from the server, upon a verification of whether the prescribed data sent by the data sending process is already accumulated with extracted data by a data accumulation process of the server, one of the prescribed data and information corresponding to the prescribed data only when the prescribed data is determined to not be already accumulated with the extracted data by the data accumulation process and after the data accumulation process accumulates the prescribed data with the extracted data and not when the prescribed data is determined to be already accumulated with the extracted data; and
an output process for outputting the one of the prescribed data and the information corresponding to the prescribed data received by the data reception process.

19. A server apparatus used by a data extraction system for extracting and accumulating prescribed data from web pages on the web, the server apparatus connected to a plurality of terminals that search for one of the web pages on the web and extract the prescribed data from the one of the web pages, the server apparatus controlled by a processor and comprising:
a data receiver, controlled by the processor, for receiving the prescribed data extracted by at least one of the plurality of terminals;
a data accumulator, controlled by the processor, for accumulating the prescribed data received by the data receiver with extracted data;
a verifier, controlled by the processor, for verifying whether the prescribed data received by the data receiver is already accumulated with the extracted data by the data accumulator, the data accumulator accumulating the prescribed data with the extracted data when the prescribed data is determined by the verifier to not be already accumulated with the extracted data; and
a data transmitter, controlled by the processor, for sending one of the prescribed data and information corresponding to the prescribed data to at least one of the plurality of terminals only when the prescribed data is determined by the verifier to not be accumulated with the extracted data by the data accumulator and after the data accumulator accumulates the prescribed data with the extracted data and not when the prescribed data is determined by the verifier to be already accumulated with the extracted data, so that the at least one of the plurality of terminals displays the one of the prescribed data and the information corresponding to the prescribed data.

20. A non-transitory computer-readable medium embodying a program for a server apparatus used by a data extraction system for extracting and accumulating prescribed data from web pages on the web, the server apparatus connected to a plurality of terminals that search for one of the web pages on the web and extract the prescribed data from the one of the web pages, the program comprising:

a data reception process for receiving the prescribed data extracted by at least one of the plurality of terminals;

a data accumulation process for accumulating the prescribed data received by the data reception process with extracted data;

a verification process for verifying whether the prescribed data received by the data reception process is already accumulated with the extracted data by the data accumulation process, the data accumulation process accumulating the prescribed data with the extracted data when the prescribed data is determined by the verification process to not be already accumulated with the extracted data; and a data sending process for sending one of the prescribed data and information corresponding to the prescribed data to at least one of the plurality of terminals only when the prescribed data is determined by the verification process to not be already accumulated with the extracted data by the data accumulation process and after the data accumulation process accumulates the prescribed data with the extracted data and not when the prescribed data is determined by the verifier to be already accumulated with the extracted data, so that the at least one of the plurality of terminals outputs the one of the prescribed data and the information corresponding to the prescribed data.

\* \* \* \* \*